US007391526B2

(12) United States Patent
Nishimura

(10) Patent No.: US 7,391,526 B2
(45) Date of Patent: Jun. 24, 2008

(54) INFORMATION PROCESSING APPARATUS AND METHOD, INFORMATION PROCESSING SYSTEM AND MEDIUM USED IN TRANSMITTING/RECEIVING AN E-MAIL WITH A FILE ATTACHED THERETO

(75) Inventor: Takanori Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1290 days.

(21) Appl. No.: 09/843,400

(22) Filed: Apr. 26, 2001

(65) Prior Publication Data
US 2002/0051181 A1    May 2, 2002

(30) Foreign Application Priority Data
Apr. 28, 2000    (JP)    ............... 2000-134310

(51) Int. Cl.
G06F 15/00    (2006.01)
G06F 17/00    (2006.01)
(52) U.S. Cl. ............... 358/1.15; 358/1.2; 358/402; 358/438; 358/451; 709/232; 715/250; 715/252
(58) Field of Classification Search ............... 358/1.15, 358/1.2, 1.9, 402, 437, 438, 449, 451; 709/230, 709/232, 206; 715/517, 523
See application file for complete search history.

(56) References Cited
U.S. PATENT DOCUMENTS
6,335,966 B1 *   1/2002   Toyoda .................. 379/100.06

6,421,429 B1 *   7/2002   Merritt et al. ............ 379/93.17
6,457,044 B1 *   9/2002   IwaZaki .................... 709/206
6,493,103 B2 * 12/2002   Toyoda et al. ............. 358/1.15
6,728,757 B1 *   4/2004   Friend ........................ 709/206
6,775,688 B1 *   8/2004   Kakimoto .................. 709/203
6,775,705 B2 *   8/2004   Maeda ....................... 709/230
2001/0039615 A1 * 11/2001  Bowker et al. ............. 713/162

FOREIGN PATENT DOCUMENTS
EP    0 719 019    6/1996
EP    0 924 921    6/1999
WO    WO 98 15091   4/1998

* cited by examiner

Primary Examiner—Douglas Q. Tran
Assistant Examiner—Chan S Park
(74) Attorney, Agent, or Firm—Oblon, Spivak, McClelland, Maier & Neustadt, P.C.

(57) ABSTRACT

In transmitting/receiving an E-mail with a file attached to it, the contents of the attached file is to be displayed in a reception terminal irrespective of the file format of a file attached to the E-mail, the image size or the maximum number of colors in displaying the file contents. To this end, the accommodating capability in a reception terminal is verified based on a mail address in sending an E-mail with an attached file to a reception terminal. If the accommodating capability in the reception terminal is not matched to the attached file, the file is converted in keeping with the accommodating capability of the reception terminal, and the E-mail is sent with the so-converted file attached to it.

10 Claims, 17 Drawing Sheets

260    261

| CONFIRM PROFILE SETTING | ? X |

FOLLOWING PROFILES ARE ADDED. IF NOT IN ERROR, PUSH [COMPLETE], PUSH [RETURN] AND [CANCEL] FOR CORRECTION AND HALT, RESPECTIVELY.

| SETTING ITEM | SETTING VALUE |
| --- | --- |
| PROFILE NAME | aaaa(J) |
| COMMENT | eeee(J) |
| MAIL (SMTP) SERVER | XXXX.YY.ZZ |
| SOURCE MAIL ADDRESS | eeee@ffff.gg.hh |
| SOURCE NAME | eeee |
| DESTINATION | aaaa@bbbb.cc.dd |
| DESTINATION (Co.) | |
| SUBJECT | test |
| SEND FORM OF ATTACHED FILE | TEXT |

☑ CONFIRM SETTING IN SENDING (C)

| RETURN(B) | COMPLETE(F) | CANCEL | HELP |

INFORMATION PROCESSING APPARATUS AND METHOD, INFORMATION PROCESSING SYSTEM AND MEDIUM USED IN TRANSMITTING/RECEIVING AN E-MAIL WITH A FILE ATTACHED THERETO

BACKGROUND OF THE INVENTION

1. Field of the Invention

This invention relates to an information processing method and apparatus, an information processing system, and a medium, which may be used with advantage in transmitting/receiving an E-mail with a file attached thereto.

2. Description of Related Art

Recently, a so-called E-mail is frequently used as one of communication means. For a terminal for transmitting/receiving this E-mail, a general purpose computer, such as a so-called personal computer or a workstation, is used in a majority of cases.

This general purpose computer is provided as a rule with a large-capacity hard disc. By using this large-capacity hard disc, an E-mail can be transmitted/received without being particularly concerned with the data size.

Moreover, in transmitting/receiving an E-mail, it is a frequent occurrence that not only the so-called text data but also data rendered into a file is attached and transmitted/received. This data rendered into a file is referred to below simply as a file. For opening the attached file at a reception terminal, an application software associated with the file form (type of the attached file), inclusive of a mailer, is necessary.

In transmitting/receiving an E-mail with a file attached thereto, if a reception terminal is a general purpose computer having the above-mentioned large-capacity hard disc, the attached file can be opened by pre-installing an application software associated with each of a variety of file formats. Of course, if the application software associated with the file format of the attached file is not installed in the general purpose computer of the reception terminal, the attached file, stored previously, may be opened by installing an application software associated with the file format after once storing the received attached file. Meanwhile, if the file need not be opened directly, but it is sufficient to see its contents, it is sufficient if a so-called viewer software associated with each of a variety of file formats is installed. On the other hand, if a file is attached, the data size tends to be increased as compared to an E-mail comprised only of text data. However, if a reception terminal is a general purpose computer having a large-capacity hard disc, the E-mail can be transmitted/received, by using the hard disc as data recording means, without the user being particularly concerned with the size of the attached file.

If an E-mail, inclusive of an attached file, is transmitted/received using a general purpose computer, it has not been necessary to be particularly concerned with the data size or the file format, as described above.

Recently, not only the general purpose computer, such as the above-mentioned personal computer or workstation, but also a variety of portable information terminals, such as PDA (personal digital assistants) carrying a general-purpose OS (operating system), a portable telephone set, a simplified portable telephone system, such as PHS (registered trademark) or a pager terminal, are in use. These terminals are referred to below collectively as portable telephone sets. In near future, a variety of electronic equipment, such as, for example, video cameras, digital still cameras, AV (audio visual) equipment, game machines for domestic use, set top boxes or a variety of household electrical products, may presumably be used as E-mail reception terminals.

However, the portable information terminals, such as the above-mentioned PDA, portable telephone sets or pager terminals, are in general poor in recording capacity of enclosed storage means, such that it is frequently difficult to get installed, or newly install, an application software, inclusive of viewer software, adapted to cope with a variety of file formats, used for opening or viewing a file attached to a variety of file formats.

On the other hand, a portable information terminals carrying a dedicated OS, such as PDA or portable telephone set, adapts itself in many cases only to predetermined file formats, so that, in such case, this portable information terminal is only able to open or view an attached file of the predetermined file format, while it is unable to open or view an attached file other than the attached file of the predetermined format. Stated differently, if an E-mail with a file attached thereto is to be transmitted to a portable information terminal carrying the dedicated OS, it becomes necessary to provide and transmit an attached file of a predetermined file format associated with the dedicated OS.

In particular, in the case of the above-mentioned portable telephone set, it may be a frequent occurrence that respective portable telephone sets differ in specifications or OS types, depending on the difference in the communication system used or in the portable telephone service offering companies furnishing portable telephone services. So, it may be a frequent occurrence that the file formats that can be opened or viewed are also different. If the communication system is the same or the portable telephone set pertains to the same portable telephone service company, it may be an occurrence that the file formats that can be opened or viewed differ depending on the OS versions or with equipment types.

It is a frequent occurrence that updating or rewriting of an application software by users at large is not possible, even though the application software can be updated or rewritten in a producer or a servicing center for the portable information terminals. So, the users at large can only use the application installed from the outset, except if the application software is rewritten at e.g., a servicing center.

It is also a frequent occurrence that the above-mentioned portable information terminals cannot display the information only in a state matched to the display capability of respective own display means. In such case, even if a reception terminal accommodates the file format itself of the attached file, and is able to open the file, but the image size or the maximum number of colors for demonstrating the contents of the opened file, for example, exceeds the display capability of the display means of the reception terminal, the file contents cannot be opened or viewed.

It may be contemplated from above that, even if, when the various portable information terminals receive E-mails, the text data excepting letters or characters unique to terminals can be viewed unobjectionably, it may occur frequently that the attached file received frequently cannot be opened or viewed, since this depends appreciably on the capability or the file format that can be accommodated by the reception terminal.

If a variety of electronic equipment, such as the aforementioned video cameras, digital still cameras, AV equipment or household electrical devices, provided with the E-mail receiving functions, and which will debut in near future, a similar problem presumably arises that a file transmitted as it is attached to the E-mail cannot be opened or viewed, as in the case of the portable information terminal, described above, because the operating systems or functions set on the electronic equipment will possibly differ from one equipment to another.

SUMMARY OF THE INVENTION

It is therefore an object of the present invention to provide an information processing method and apparatus, an information processing system and a medium whereby, in transmitting an E-mail having a file attached thereto and opening or viewing the attached file in a reception terminal, the contents of the attached file can be displayed at the reception terminal irrespective of the file format of the file transmitted as it is attached to the E-mail, the picture size for demonstrating the file contents, or of the maximum number of colors.

In one aspect, the present invention provides a information processing apparatus for transmitting the information to be transferred to a reception terminal, including accommodating capability verifying means for verifying the information accommodating capability in the reception terminal or in a communication system encompassing the reception terminal, based on the destination information in sending the transfer information to the reception terminal, information converting means for converting the transfer information to be transmitted in meeting with the information accommodating capability in the reception terminal or in the communication system encompassing the reception terminal if the information accommodating capability in the reception terminal or in the communication system encompassing the reception terminal is not matched to the transfer information to be transmitted, and transmission means for transmitting the transfer information.

In another aspect, the present invention provides an information processing method for transmitting the information to be transferred to a reception terminal, including verifying the information accommodating capability in a reception terminal or in a communication system encompassing the reception terminal, based on the destination information in sending the transfer information to the reception terminal, converting the transfer information to be transmitted in meeting with the information accommodating capability in the reception terminal or in the communication system encompassing the reception terminal if the information accommodating capability in the reception terminal or in the communication system encompassing the reception terminal is not matched to the transfer information to be transmitted, and transmitting the transfer information.

In still another aspect, the present invention provides an information processing system including one or more reception terminals and one or more transmission terminals, in which the transmission terminal sends the transfer information to a desired reception terminal including accommodating capability verifying means for verifying the information accommodating capability in the reception terminal or in a communication system encompassing the reception terminal, based on the destination information in sending the transfer information to the reception terminal, information converting means for converting the transfer information to be transmitted in meeting with the information accommodating capability in the reception terminal or in the communication system encompassing the reception terminal if the information accommodating capability in the reception terminal or in the communication system encompassing the reception terminal is not matched to the transfer information to be transmitted, and transmission means for transmitting the transfer information. The reception terminal includes reception means for receiving the transfer information sent from the transmission terminal and information opening means for opening the transfer information received.

In still another aspect, the present invention provides an information processing method including verifying the information accommodating capability in the reception terminal or in a communication system encompassing the reception terminal based on the destination information in transmitting the transfer information to the reception terminal, converting the transfer information to be transmitted in meeting with the information accommodating capability in the reception terminal or in the communication system encompassing the reception terminal if the information accommodating capability in the reception terminal or in the communication system encompassing the reception terminal is not matched to the transfer information to be transmitted, transmitting the transfer information and opening the transfer information received.

In still another aspect, the present invention provides a medium for causing an information processing apparatus to execute a program including a step of verifying the information accommodating capability in a reception terminal or a communication system encompassing the reception terminal based on the destination information in sending the transfer information to a reception terminal, a step of converting the transfer information transmitted in keeping with the information accommodating capability in the reception terminal or a communication system encompassing the reception terminal if the information accommodating capability in the a reception terminal or the communication system encompassing the reception terminal is not matched to the transfer information transmitted, and a step of sending the transfer information.

In yet another aspect, the present invention provides a medium for causing an information processing apparatus to execute a program including a step of verifying the information accommodating capability in a reception terminal or a communication system encompassing the reception terminal based on the destination information in sending the transfer information to a reception terminal, a step of converting the transfer information transmitted in keeping with the information accommodating capability in the reception terminal or a communication system encompassing the reception terminal if the information accommodating capability in the a reception terminal or the communication system encompassing the reception terminal is not matched to the transfer information transmitted, a step of sending the transfer information, a step of receiving the transfer information transmitted and a step of opening the transfer information received.

According to the present invention, the information accommodating capability in a reception terminal or in a communication system encompassing the reception terminal is verified on the basis of the destination information in sending the transfer information to the reception terminal. If the information accommodating capability is not matched to the transfer information transmitted, the information is transmitted after conversion in keeping with the information accommodating capability, so that, when the E-mail with an attached file is sent as the information for transmission and the attached file is opened or viewed at the reception terminal, the contents of the attached file can be displayed at the reception terminal irrespective of the file format of the attached file sent attached to the E-mail, the image size or the maximum number of colors in displaying the file contents.

BRIEF DESCRIPTION OF THE DRAWINGS

FIG. 10 shows an exemplary display of a dialog for confirming profile setting when a correction button is clicked on a profile setting confirming dialog shown in FIG. 9.

DESCRIPTION OF THE PREFERRED EMBODIMENTS

Figure 1:
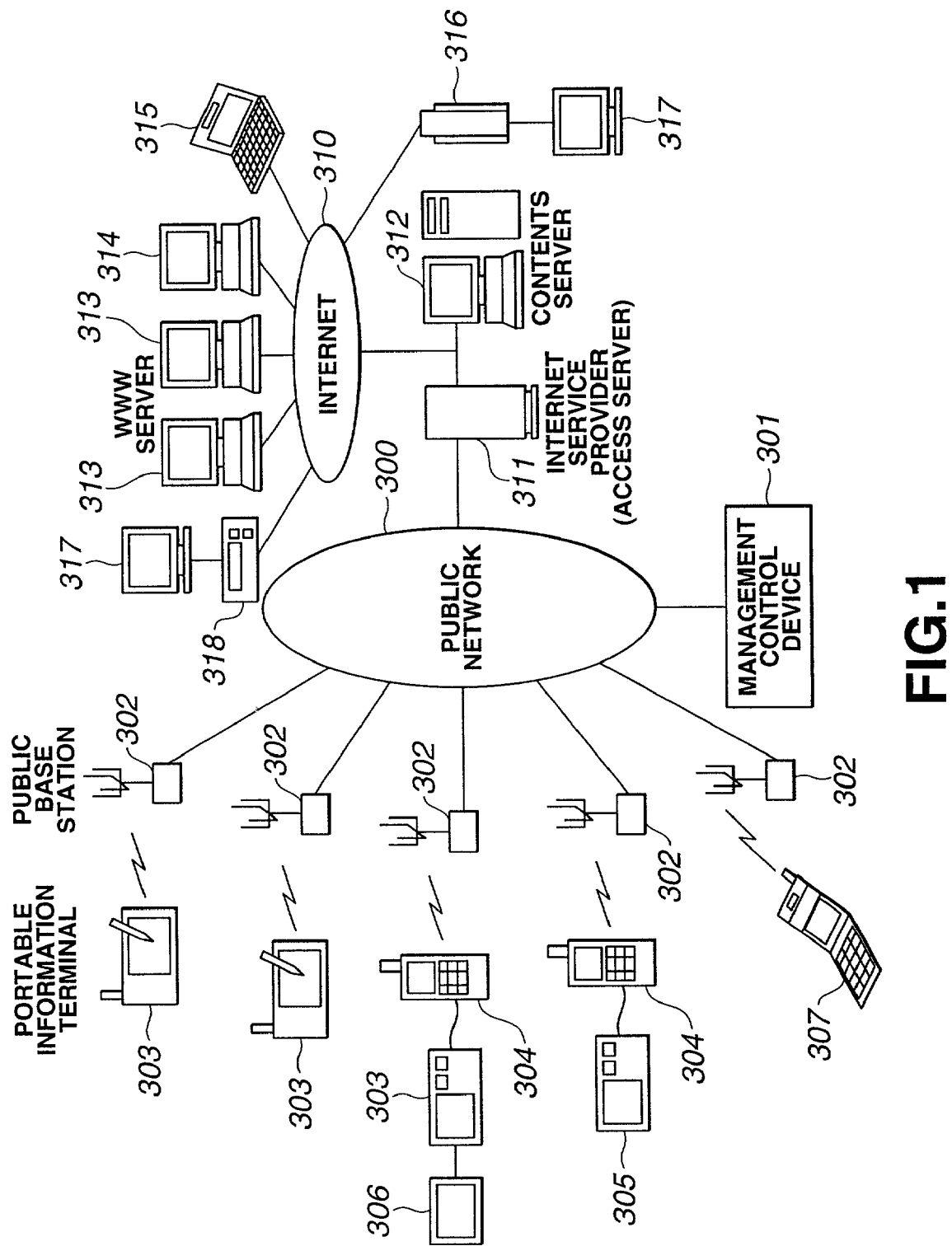
FIG. 1 shows an overall system structure of an embodiment of the present invention.

Referring to the drawings, a preferred embodiment of the present invention will be explained in detail.

First, schematics of a technique as adopted in the present embodiment, whereby, in transmitting an E-mail as a file is attached thereto, and in opening or viewing the file so attached in a reception terminal, the contents of the attached file can be displayed in the reception terminal irrespective of the file format of the attached file transmitted with the E-mail, the image size of the image demonstrating the file contents, or the maximum number of colors, are explained. In the following explanation, a reception terminal embodying the present invention is a portable telephone set, inclusive of a simplified portable telephone system terminal, and an E-mail having a file attached thereto is transmitted to the portable telephone set. However, the reception terminal is not limited to the portable telephone set, but may also be a variety of portable information terminals, such as PDA or pager terminals, video cameras, digital still cameras, AV equipment, household game machines, set top boxes or a variety of household electrical equipment. Also, in the following explanation, an image file of a still image is taken as an example of a file attached to a portable telephone set, as a reception terminal. However, the file is not limited to an image file, and may also be a file of speech, music or moving pictures. There is also no limitation as to the file format. Moreover, although the attached file is converted in the present embodiment, by way of an example, the present invention encompasses the function of converting the format of a main text of the E-mail into a format that can be accommodated by a reception terminal in case the format of the main text of the E-mail itself at the transmission terminal is not matched to that in the reception terminal.

In general, in transmitting an E-mail, there necessarily exists the mail address of a counterpart side. The mail address is represented e.g., as [aaaa @ bbbb.cc.dd] or as aaaa @ bbbb.dd], with the number of letters being arbitrary. The [aaaa] ahead of @ is the information for identifying a user receiving the E-mail, and may be set arbitrarily by a user, wherein there may be a sole or plural number of user terminals. The [bbbb.cc.dd] or the [bbbb.dd], at back of @ is termed a domain name, used for identifying a company, organization, E-mail servicing company, an Internet provider or a personal computer communication firm, and is set from one company or E-mail servicing company etc., to another. Meanwhile, the [.dd] at the trailing end of the domain name is classified into a top level domain as set from territory to territory and a general top level domain as set irrespective of the territory.

If the reception terminal is a portable telephone set, the domain name is set in a majority of cases from one portable telephone servicing company to another, so that it is probably possible to identify the portable telephone servicing company from the domain name of the mail address of the transmitted E-mail. That is, if it can be specified from the domain name of the mail address of the transmitted E-mail to which of the portable telephone servicing companies corresponds the portable telephone set, it presumably becomes possible to specify the type of the portable telephone set, file format that can be accommodated by the portable telephone set, such as image format, the maximum size of the E-mail that can be accommodated by the portable telephone set, the maximum file size of the display means of the portable telephone set, or the maximum pixel size or the maximum number of colors, these being hereinafter termed capabilities accommodated, as appropriate.

So, if the capabilities accommodated by the portable telephone set as reception terminal are known as described above, it becomes possible for the E-mail transmission terminal to convert the file format etc., in keeping with the capabilities accommodated to transmit the as-converted file as it is attached to an E-mail transmitted to permit the portable telephone set on the receiving side to open the attached file, that is to open and display the image file.

Meanwhile, if, when an image file is transmitted from a transmission terminal as a file attached to an E-mail, the reception terminal is inherently not adapted to image display, as when the reception terminal is able to display the text but is not provided with the function of displaying an image, it may be contemplated to insert automatically an URL (uniform resource locator) for viewing the image file into the main text of the E-mail and to transmit the resulting E-mail. This enables a user at the reception terminal to view an image of the image file using e.g., an equipment enabling an image file to be viewed, such as a personal computer. On the other hand, if, when an image file is transmitted from a transmission terminal as a file attached to an E-mail, the reception terminal is adapted to an image file of a still image but is not adapted to an image file of a moving picture, it may be contemplated to prepare only an initial frame of the moving picture or a sole frame characteristic of the moving picture, as an image file of a still image, and to transmit the so-prepared image file as an attached file to the reception terminal, as well as to transmit an E-mail, along with URL, used for viewing the image file of the moving picture, automatically inserted into e.g., a main text of the E-mail. This enables a user at the reception terminal to view the moving picture with the image file of the moving picture attached to the E-mail, using an equipment enabling the image file to be viewed, such as, for example, a personal computer. This can be done not only for an image file but also for audio or music files.

There may be occasions where the capabilities accommodated by the reception terminal cannot be determined from only the domain name of the E-mail address. In such case, the supplementary information indicating the capabilities accommodated by the reception terminal is used. This supplementary information is such information that can be acquired by making inquiries at a server who retains the capabilities accommodated by plural reception terminals in the form of tables or lists, or the information acquired on designation by a user on the transmission terminal.

That is, if the capabilities accommodated by the reception terminal cannot be determined from only the domain name of the E-mail address, the transmission terminal may have communication with e.g., the above-mentioned server to acquire the supplementary information representing the capabilities accommodated by the reception terminal, or to acquire the supplementary information on request from a user to recognize the capabilities accommodated by the reception terminal from the so-acquired supplementary information to convert the file attached to the E-mail in keeping with the capabilities accommodated by the reception terminal to transmit the so-converted file.

In this manner, if the information from the domain name of the E-mail address is insufficient to verify the capabilities accommodated by the reception terminal, it is possible for a reception terminal to open or view the attached file.

Of course, the supplementary information can be used even in such a case wherein the capabilities accommodated by the reception terminal can be determined from the domain name of the E-mail address. That is, in such case, it is possible to determine only coarsely the capabilities accommodated by the reception terminal, from the domain name of the E-mail address, and to use the supplementary information further to effect file conversion matched more finely to the capabilities accommodated by the reception terminal.

Based on the technique used in the above-described embodiment of the present invention, an illustrative structure of a system embodying the present invention, exemplary structures of the transmission and reception terminals and an exemplary operation of the system and the terminals, are hereinafter explained.

FIG. 1 shows an overall illustrative structure of the system embodying the present invention. It should be noted that this structure is merely exemplary and is not intended to limit the invention.

Referring to FIG. 1, one or more radio base stations 302 are arranged in a geographically distributed fashion and a set of several near-by radio base stations make up a local area. A set of plural local areas of the radio base stations 302 make up a service area of the mobile communication system.

Each of the mobile stations 303, 304 and 307, each of which may be plural, is made up of portable telephone sets 304, 307, having call and data communication functions, or a portable information terminal 303, such as a PDA, having the data communication functions and radio accessing functions, and is connected over a radio network to the near-by base station in a cell formed by each of the radio base stations 302. Although there is no particular limitation in the present embodiment to the radio accessing system between the radio base station 302 and the mobile stations 303, 304, 307, there are a variety of the radio accessing systems, such as, for example, so-called TDMA-TDD system, CDMA system or the W-CDMA system. It is noted that there can be connected e.g., multi-media communication terminals 305 or personal computers to each mobile station, whilst a monitor 306 can be connected to the multimedia communication terminals 305.

On the other hand, each of the radio base stations 302 is connected over e.g., a wired network to a public network 300, which is provided e.g., with ISDN (Integrated Services Digital Network) and an interfacing network for housing each of the radio base stations 302 in this ISDN. To this public network 300 are connected a large number of wired subscriber terminals, a computer network or an intra-company network. In the case of the Internet, for example, an access server 311 of the Internet service provider is connected to the ISDN. It is via this access server 311 that the public network 300 is connected to the Internet. A large number of WWW (worldwide web) servers 313 are connected to the Internet 310 and, by using this TCP/IP protocol, these WWW servers 313 can be accessed from the wired subscriber terminals or from the above-mentioned mobile stations.

To the access server 311 is connected a contents server 312 owned by the Internet service provider. This contents server 312 has the functions of furnishing various information including moving pictures responsive to requests from the wired subscriber terminals and from the mobile stations. Meanwhile, a management control device 301 serves for the mobile communication network by performing authentication or assessment processing for each mobile station.

Among wired subscriber terminals, connected to the Internet 310, there are a variety of electronic equipment, such as personal computers 314, 315, having the Internet browser installed therein, household game machines 316, each having the Internet browser functions, set top boxes 318, and other electrical devices, not shown, such as video cameras, digital still cameras, AV equipment and household electrical utensils or devices. Meanwhile, the household game machines 316, set top boxes 318 and other electronic equipment are connected to a monitor 317 as necessary.

If, in the system configuration, shown in FIG. 1, the portable telephone set 304, in the above-mentioned mobile stations, is used as a reception terminal, a personal computer 315 having a camera and an external memory interface IF is used as a transmission terminal, and an E-mail having a file attached thereto is transmitted from the camera and the external memory interface IF, the personal computer 315 verifies, with the aid of the supplementary information as necessary, the capabilities of the portable telephone set, from the domain name of the E-mail address to the portable telephone set as the reception terminal as described above, to transmit the E-mail with an attached file now converted to cope with the capabilities of the portable telephone set of the reception terminal.

The structure and the operation of the personal computer 315, in case an E-mail with an attached file is transmitted to the portable telephone set of the reception terminal, using the personal computer 315 having a camera and an external memory interface IF, as a reception terminal, are hereinafter explained.

Figure 2:
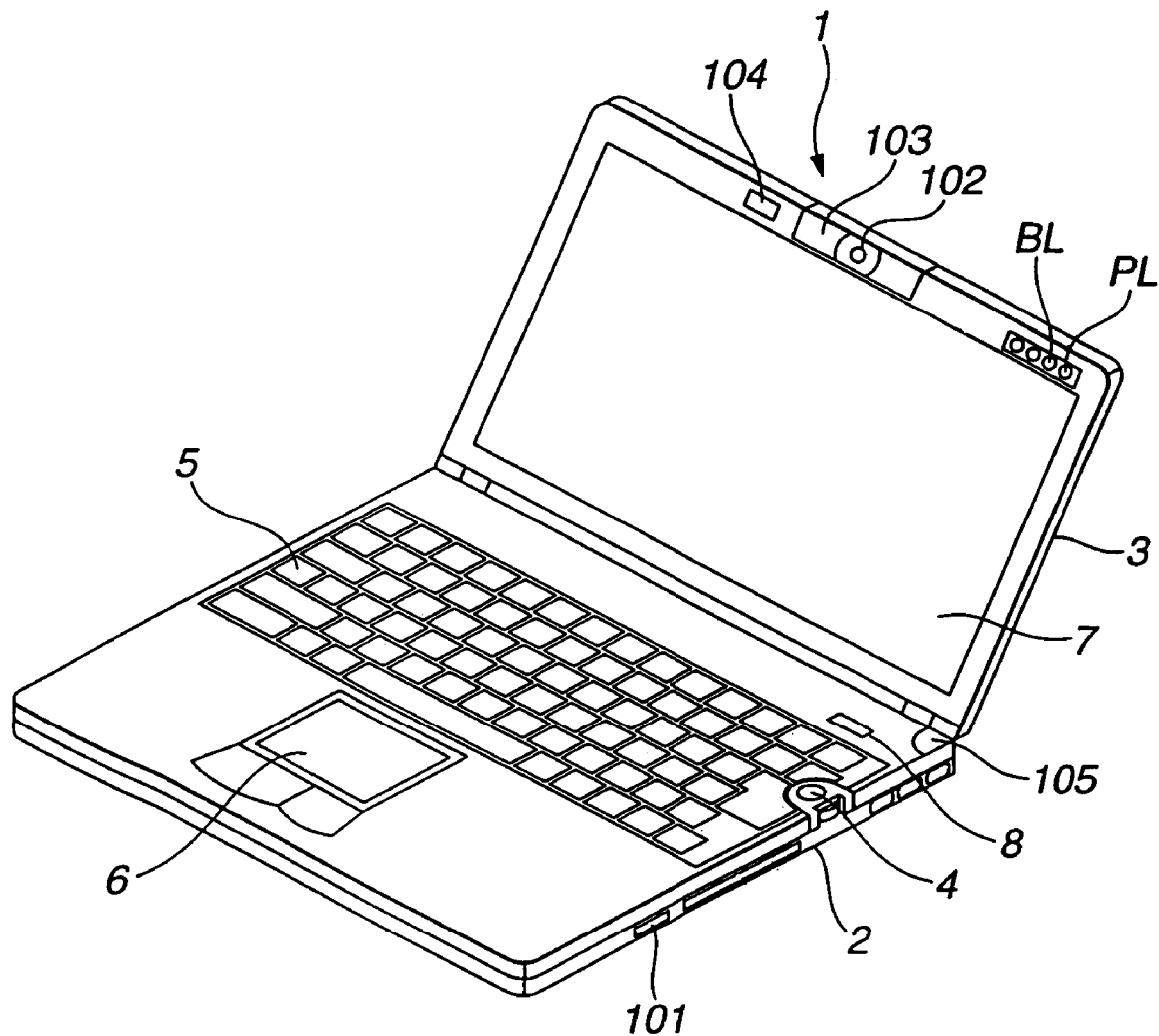
FIG. 2 is a perspective view of a notebook personal computer according to an embodiment of the present invention.
Figure 3:
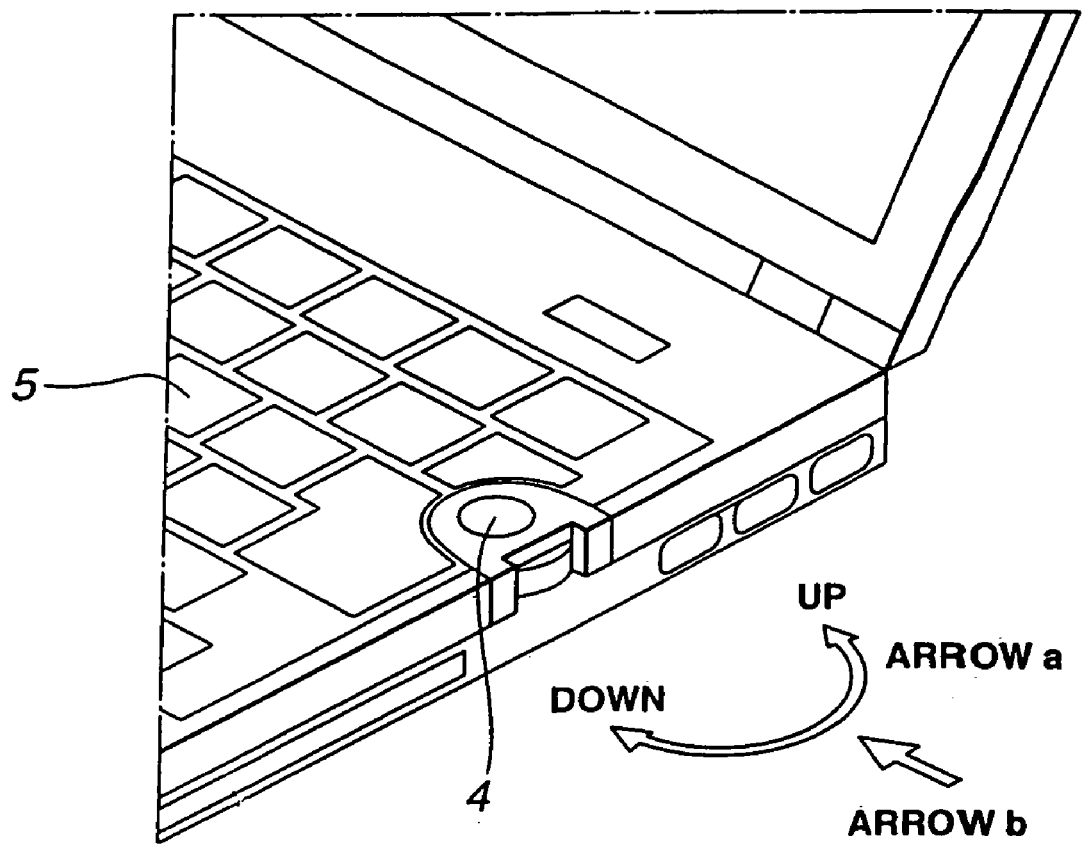
FIG. 3 is an enlarged view showing the vicinity of a jog dial of the notebook personal computer shown in FIG. 1.

FIGS. 2 and 3 illustrate the appearance of a notebook personal computer 1, as the personal computer 315 having a camera and an external memory interface IF, as an embodiment of the present invention. Basically, the notebook personal computer 1 is made up of a main body unit 2, and a display unit 3 that can be opened or closed with respect to the main body unit 2. FIGS. 2 and 3 show a perspective view showing the display unit 3 opened with respect to the main body unit 2 and an enlarged view showing a jog dial 4 provided on the main body unit 2 and a near-by portion.

The main body unit 2 includes, on its upper surface, a keyboard 5, acted on when inputting a variety of letters or symbols, a touch pad 6 as a pointing device acted on in moving a pointer (mouse cursor), and a power source switch 8, while including, on its lateral surface, the jog dial 4 or an IEEE1394 input/output port 101. Meanwhile, a stick type pointing device may also be provided in place of the touch pad 6.

On the front side of the display unit 3 is mounted an LCD (liquid crystal display) 7 for displaying an image. On the upper right side of the display unit 3, there are provided a power source lamp PL, a battery lamp BL, a message lamp ML, as necessary, and other lamps formed by LEDs (light emitting diodes). On e.g., the upper mid portion of the display unit 3, there are provided a CCD video camera 102 having a charge coupled device (CCD) and a microphone 104. On e.g., an upper right portion of the main body unit 2, there is provided a shutter button 105 of the CCD video camera 102. The CCD video camera 102 is provided on a rotational driving movement mechanism 103 which renders a lens unit of the camera rotationally movable with respect to e.g., the display unit 3. Meanwhile, the power source lamp PL, a battery lamp BL or the message lamp ML may also be provided on a lower portion of the display unit 3.

The jog dial 4 is built on e.g., a right end of the keyboard 5 on the main body unit 2 and is mounted substantially flush with each keyboard key. The jog dial 4 is responsive to the rotational operation in the direction indicated by arrow a to execute pre-set operations in order to execute the operation associated with the movement in the direction indicated by arrow b in FIG. 3. Meanwhile, the jog dial 4 may be arranged on the left lateral side of the main body unit 2, on the left or right side lateral surface of the display unit 3 provided with the LCD 7, or on a line passing through keys G and H of the keyboard 5. The jog dial 4 may also be arranged centrally of the front surface to permit it to be operated with a thumb finger as the touch pad 6 is operated with an index finger. Alternatively, the jog dial 4 may be provided in a line passing through right and left buttons of the touch pad 6. Moreover, the jog dial 4 may be arranged in an oblique direction at a pre-set angle, instead of being arranged in the horizontal direction or in the vertical direction, for facility in operation with respective fingers. The jog dial 4 may also be arranged at a position on the lateral surface of a mouse as a pointing device that permits facilitated operation with the thumb finger. As the jog dial, a rotary electronic component fitted with a push switch, as disclosed in Japanese Laying-Open Publication H-8-203387, filed in the names of the present Assignee and other co-assignees, may be used.

Figure 4:
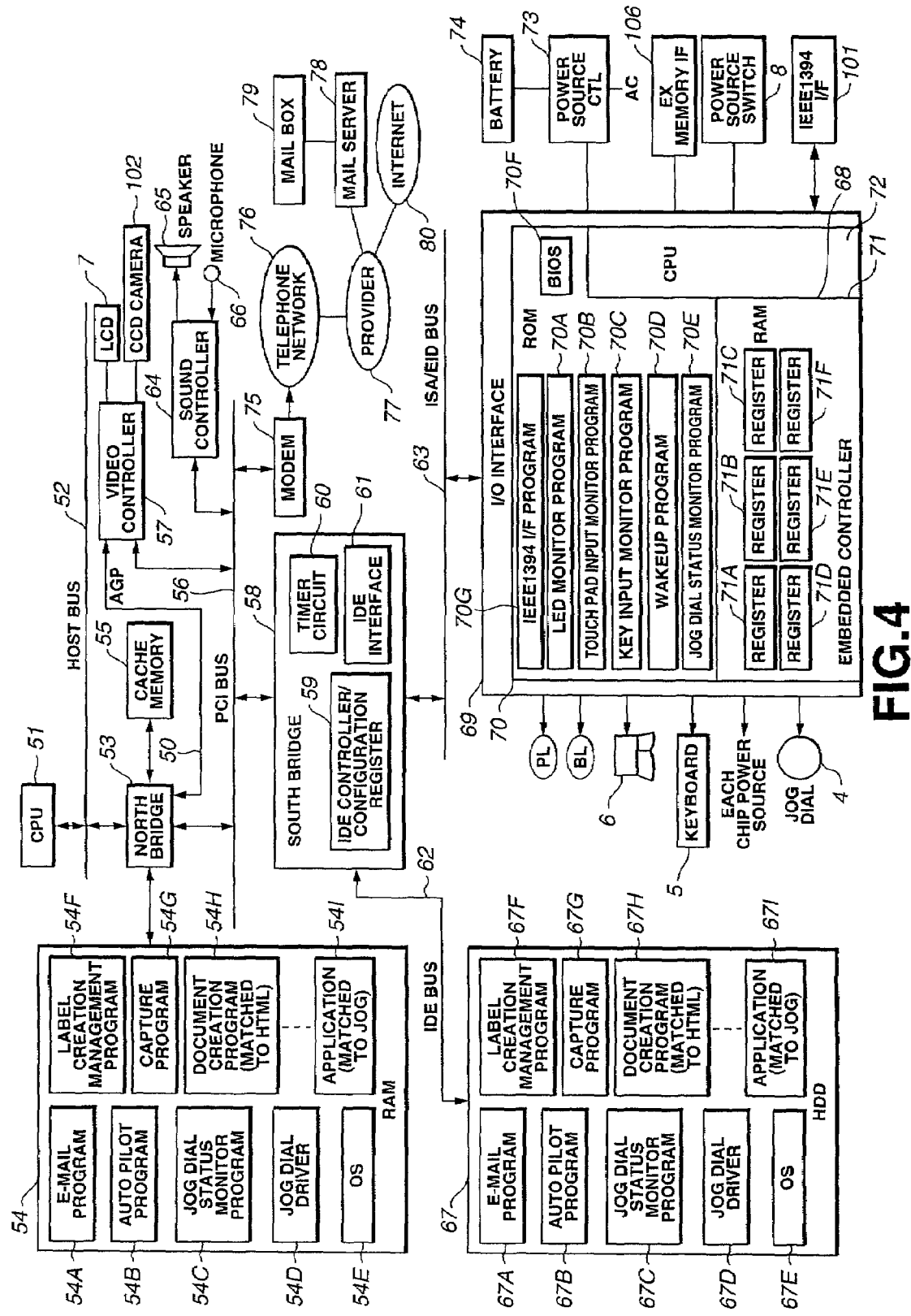
FIG. 4 is a block circuit diagram showing an electrical structure of the interior of the notebook personal computer shown in perspective in FIG. 1.

Referring to FIG. 4, an exemplary electrical structure of the notebook personal computer 1 of the present embodiment is explained. It is noted that a public telephone network 76, an Internet service provider 77, a communication network 80 and a mail server 78 are connected to the personal computer 1 and are shown in one drawing sheet for convenience in explanation.

A central processing unit (CPU) 51, constructed as a Pentium (trademark) processor, for example, is connected to a host bus 52. To this host bus 52 is connected a northbridge (AGP host bridge controller) 53 which in turn is connected to an AGP (accelerated graphics port) 50 and a PCI bus 56. The northbridge 53 is connected via AGP 50 to a video controller 57. The northbridge 53 and a southbridge (PCI-ISA bridge) 58 make up a so-called chip set.

The northbridge 53 is further connected to a main memory 54 and to a cache memory 55. The cache memory 55 is adapted for caching data used by the CPU 51. Although not shown, a first-order cache memory is enclosed in the CPU 51.

The main memory 54 is built by e.g., a DRAM (dynamic read-only memory) and is adapted for storing a program executed by the CPU 51 and data required for the operation of the CPU 51. Specifically, at a time point of end of booting, there are stored in the main memory 54 an E-mail program 54A according to the present embodiment, an automatic pilot program 54B, a jog dial status monitoring program 54C, a jog dial driver 54D, and an operating system program (OS) 54E, a label forming management program 54F, a capture program 54G, and a document forming program 54H, having the HTML file editing program, as application programs, and other application programs 54I, are transferred from an HDD 67 to the main memory 54 for storage therein.

The video controller 57 is connected to the PCI bus 56 and, based on data furnished over the PCI bus 56, controls the display on the LCD 7 of the display unit 3, while sending video data from the CCD video camera 102 to the PCI bus.

A sound controller 64 is connected to the PCI bus 56 and captures the speech input from the microphone 66 or furnishes speech signals to a loudspeaker 65. A modem 75 is also connected to the PCI bus 56.

The modem 75 can be connected through the Internet service provider 77 to the communication network 80, such as the Internet, or to the mail server 78.

The southbridge 58 is also connected to the PCI bus 56. The southbridge 58 is constructed by e.g., PIIX4E manufactured by INTEL INC. to control a variety of input/output units. That is, the southbridge 58 is formed by IDE (integrated drive electronics) controller/configuration register 59, a timer circuit 60, and by an IDE interface 61, and is configured for controlling devices connected over an ISA/EIO (industry standard architecture/extended input output) bus 63 and an embedded controller 68.

The IDE controller/configuration register 59 is made up of two IDE controllers, namely a so-called primary IDE controller, not shown, and a secondary IDE controller, and a configuration register, also not shown.

The primary IDE controller is connected over an IDE bus 62 to a connector, not shown. To this connector is connected the HDD 67. The secondary IDE controller is designed so that, when bay devices, as so-called IDE devices, such as CD-ROM drives, second HDD or FDD, not shown, are loaded over another IDE bus, the secondary IDE controller is electrically connected to connectors of the so-loaded bay devices.

To the ISA/EIO bus 63 is further connected an embedded controller 68 which is comprised of a micro-controller and used as an I/O controller. Thus, the embedded controller 68 is comprised of an interconnection of an I/O interface 69, a ROM 70, a RAM 71 and a CPU 72.

In the ROM 70 are pre-stored an LED control program 70A, a touch pad input monitor program 70B, a key input monitor program 70C, a wakeup program 70D, a jog dial status monitor program 70E, an IEEE 1394 I/F program 70G and an external memory IF program, not shown.

The LED control program 70A is a program for controlling the lighting of LED lamps, namely a power source lamp PL, a battery lamp BL, a message lamp ML, as necessary, and other LED lamps. The touch pad input monitor program 70B is used for monitoring the inputting by the user from the touch pad 6. The key input monitor program 70C is a program for monitoring the inputting from the keyboard 5 or from other key switches. The wakeup program 70D is used for supervising each chip by checking whether or not the time is the pre-set time, based on the current time data furnished from the timer circuit 60 in the southbridge 58, for booting pre-set processing or program. The IEEE 1394 I/F program 70G is a program for executing I/F of data conforming to IEEE1394 transmitted/received over the IEEE1394 input/output port 101. The jog dial status monitor program 70E is used for perpetually monitoring whether or not a rotary encoder unit of the jog dial 4 has been rotated or thrust. The external memory IF program is a processor for transmitting/receiving data through an external IF memory 106 between it and a removable external memory medium, not shown, having a stick-, card- or stamp-like semiconductor memory, not shown, enclosed in casing.

In the ROM 70 is further written a BIOS70F. The BIOS (basic input/output system) means a basic input/output system and is a software program for controlling data exchange (input/output) between the OS or the application program and a peripheral, such as a display, keyboard or HDD.

The RAM 71 includes, as registers 71A to 71F, registers for LED control, touch pad input status, key input status and for time setting, an I/O register for monitoring the jog dial status, an IEEE1394 I/F register and a register for external memory IF register. For example, when the jog dial 4 is thrust, the LED control register controls the lighting of the message lamp ML displaying the instantaneous E-mail starting status. When the jog dial 4 is thrust (pushed), an operating key flag is stored in the key input status register. The setting time register can be set at an optional time point.

To this embedded controller 68 are connected the jog dial 4, touch pad 6, keyboard 5, IEEE1394 input/output port 101 and the shutter button 105, through a connector, not shown, so that signals associated with the operations of the jog dial 4, touch pad 6, keyboard 5 and the shutter button 105 will be output to the IS A/EIO bus 63, and so that data will be transmitted/received to or from outside through the IEEE1394 input/output port 101. To the embedded controller 68 are also connected LED lamps, such as a power source lamp PL, a battery lamp BL, a message lamp ML, as necessary, and other LED lamps.

A power source control circuit 73 is connected to an enclosed battery 74 or to an ACCOMMODATING CAPABILITY power source for furnishing the necessary power to each block and for exercising control to charge secondary batteries of the peripheral devices. The embedded controller 68 monitors the power source switch 8 which is operated for turning the power source on or off.

The embedded controller 68 is able to execute the programs 70A to 70E and 70G, by the internal power source, even if the power source 8 is turned off That is, these programs are run at all times even if no window is open on the LCD 7 of the display unit 3. That is, the embedded controller 68 causes the jog dial status monitor program 70E to be run perpetually even if the power source switch 8 is off and hence the OS 54E is not booted by the CPU 51, such that the notebook personal computer 1 may be endowed with the function of a programmable power key (PPK) function, even if the notebook personal computer 1 is not provided with a dedicated key, so that, in the power saving state or in the power source off state, a desired software or a script file can be booted simply by the user thrusting the jog dial 4.

In the HDD 67, there are stored an E-mail program 67A, an autopilot program 67B, a jog dial status monitor program 67C, a jog dial driver Jog dial driver 67D, an OS (basic program software) 67E, a label preparation management program 67F, a capture program 67G, a document preparation program 541 and other application programs 671. These programs 67A to 671 in the HDD 67 are sequentially transferred into the RAM 54 for storage therein in the course of the boot-up processing.

The E-mail program 67A exchanges a communication message over e.g., a network and modem 75 from e.g., a communication circuit, such as a telephone network 76, while checking for the capabilities accommodated by the reception terminal, based on the domain name of the E-mail address to the reception terminal, as described above, using the supplementary information as necessary, to transmit an E-mail to which is attached a file now converted to cope with the capabilities accommodated by the reception terminal. The E-mail program 67A also has the function of acquiring the oncoming mail as a specified function. This oncoming mail acquiring function ascertains whether or not a mail addressed to the user has arrived at a mail box 79 of the mail server 78 in the provider 77 to acquire a mail addressed to the user, if there is any.

The autopilot program 67B sequentially boots pre-set plural processing operations in a pre-set sequence by way of processing.

The OS (basic program software) 67E receives a notice from each application program as to whether or not a jog dial is coped with and, if the result is affirmative, displays what can be done by acting on the jog dial 4. The jog dial status monitor program 67C is usually awaiting an event on the jog dial 4 and has a list for receiving a notice from the application program. The jog dial driver Jog dial driver 67D executes the various functions responsive to the actuation of the jog dial 4.

The label preparation management program 67F is a program performing the operation of affixing a tag sheet as a mark on a paper document or entering a memo on the tag sheet and affixing the tag sheet as a reminder on a desktop (monitor) screen of a personal computer. In the present embodiment, a tag sheet displayed on the desktop screen is termed a label. The label preparation management program 67F has a function of handling texts, such as letters or symbols, images or pictures, such as still images or moving pictures or the sound, such as speech or music sound, as an object that can be affixed to the label as a tag sheet displayed on the desk top, a function of editing the text affixed to the label, a function of recording and/or reproducing the sound affixed to the label, a function of capturing/displaying a picture, inclusive of the moving picture, affixed to the label, and a function of cooperating with an application program for capturing an image from a digital camera or a CCD camera annexed to the personal computer. Moreover, the label preparation management program 67F has, as the temporal supervising function, a function of forming a label having the hysteresis of managing and changing a schedule, a function of importing schedule data from another schedule software and exporting the schedule data to other schedule software, a function of fully supporting a jog dial as to the temporal supervising function, and a function of handling links as objects to be affixed to the label. Typical of the label preparation management program is an application program for displaying a label as a tag sheet on the desk top for realizing a desk top environment capable of performing time displacement, as disclosed in Japanese Patent Application H-11-108535 (internal priority application of the Japanese Patent Application H-10-321772), as proposed previously by the present Assignee. It is also possible for this label preparation management program 67F to capture a file attached to the E-mail (label-related file) in cooperation with the E-mail program 67A of the present embodiment.

The capture program 67G is such an application program having the function of capturing a moving picture or a still image from the CCD video camera 102, digital video camera or a digital still camera, a still image from a flathead scanner or from a film scanner, a stick-, card- or stamp-like external semiconductor memory enclosed in a casing, or a still image or a moving picture recorded on a recording medium, such as a magnetic disc or an optical disc, or furnished from a communication network, storing or transferring over a network the still image or the moving picture as a still image file, in a variety of image formats, such as JPEG file, or as a moving picture file. The capture program 67G is also able to cooperate with the E-mail program 67A of the present embodiment to capture the image or picture file attached to the E-mail.

As typical of other plural application programs 67I, stored in the HDD 67, there are, for example, media bar (trademark) as a tool for music-related operating tool, a smart pad (trademark) as a free hand writing memo tool employing the touch pad 6, and a schedule management tool. With the music-related operating tool, the operation of selecting the reproduction of the next or previous music number, pausing or sound recording, is performed by scrolling e.g., with a jog dial or a keyboard. With this free hand writing memo tool, the touch pad 6 is used as the absolute coordinate detection means, and the free hand writing memo input from the touch pad 6 is processed by a drawing application program for display. With each of these programs, the file attached to the E-mail, such as audio or free hand writing memo file, can be captured in cooperation with the E-mail program 67A of the present embodiment.

A document forming program (word processor program) 67H is such an application program which creates a document based on an input from the keyboard 5 or on the free hand writing input from the touch pad 6 and which enables creation and editing of an HTML file having the still image, moving picture or the sound affixed thereto. As typical of the document forming program, there is a smart write (trademark). In each of these programs, the file attached to the E-mail can be captured in cooperation with the E-mail program 67A.

The processing flow in the E-mail program 67A of the present embodiment for capturing an image in cooperation with the capture program 67G for generating an image file, and verifying the capabilities accommodated by a reception terminal from the domain name of an address of an E-mail to the reception terminal, using the supplementary information as necessary, to convert the image file in keeping with the capabilities accommodated by the reception terminal to attach the so-converted image file to the E-mail transmitted, and illustrative display of e.g., a dialog demonstrated on the desk top screen in the course of the processing, are now explained. Meanwhile, the processing to be now explained is the processing carried out by the CPU 51 of the personal computer based on e.g., the aforementioned E-mail program or the capture program.

Figure 5:
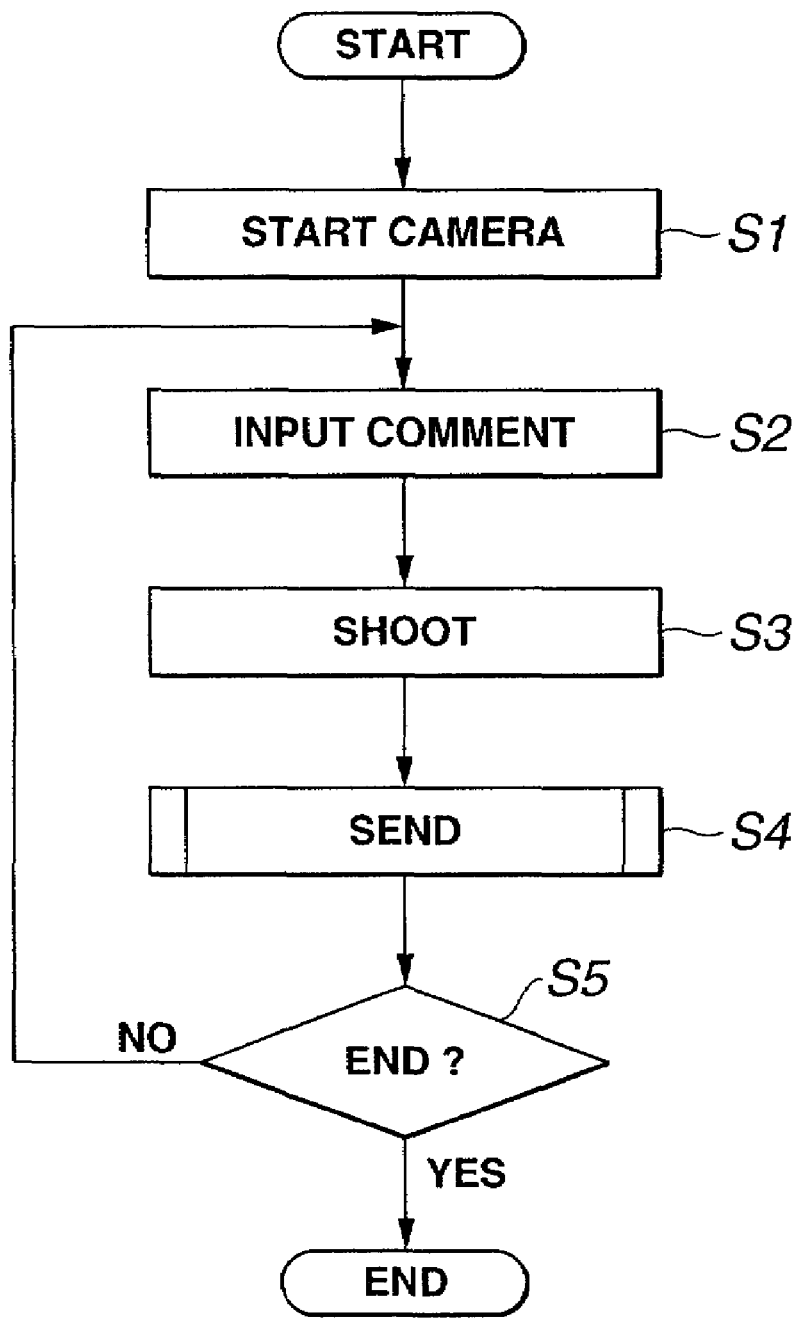
FIG. 5 is a flowchart showing the overall processing flow from photographing an image and preparation of an image file until transmission of an E-mail having the image file attached thereto as an attached file.

First, as a transmission terminal of the present embodiment, the overall processing flow from the image photographing and image file creation by the personal computer 1, 315 fitted with the camera and the external memory IF until transmission of an E-mail along with the image file as an attached file, is shown in FIG. 5.

If, in FIG. 5, an E-mail program is booted, an image is captured, and an E-mail having attached the image file thereto is created and transmitted, the CPU 51 first boots a capture program, operated in cooperation with the E-mail program, to enable the operation of the CCD video camera 102. Meanwhile, the image captured by the capture program is not limited to an image photographed by the CCD video camera 102 but may also be an image photographed by e.g., a digital video camera or a digital still camera, an image from a flat head scanner or a film scanner, or an image recorded on a variety of recording mediums, such as external memories. If an image photographed by an externally connected video camera or digital still camera, an image read out from the recording medium or an image furnished over a communication network, is used, instead of an image photographed by the CCD video camera 102, the camera booting processing of step S1 is not carried out, such that only the capture program is booted.

Then, at step S2, the CPU 51 requests a user to input e.g., a sentence used as a comment of the main text of the E-mail, in accordance with the E-mail program, and is at a standby state to await the inputting of the sentence by e.g., letters based on the free hand writing by the user via e.g., the keyboard 5 or the touch pad 6.

When next the comment inputting of step S2 ends, the CPU 51 is in a stand-by state of awaiting the image photographed by the capture program at step S3. The CPU 51 then photographs an image and captures the photographed image data in accordance with user commands. If, instead of photographing an image by the CCD video camera 102, an image photographed by an externally connected video camera or digital still camera, an image read out from the recording medium, an image read out from the recording medium or the image furnished over a communication network, is used, only the processing of capturing these images is performed at step S3. It is of course possible to reverse the sequence of the comment inputting processing at step S2 and the image capturing (photographing processing) at step S3.

Figure 6:
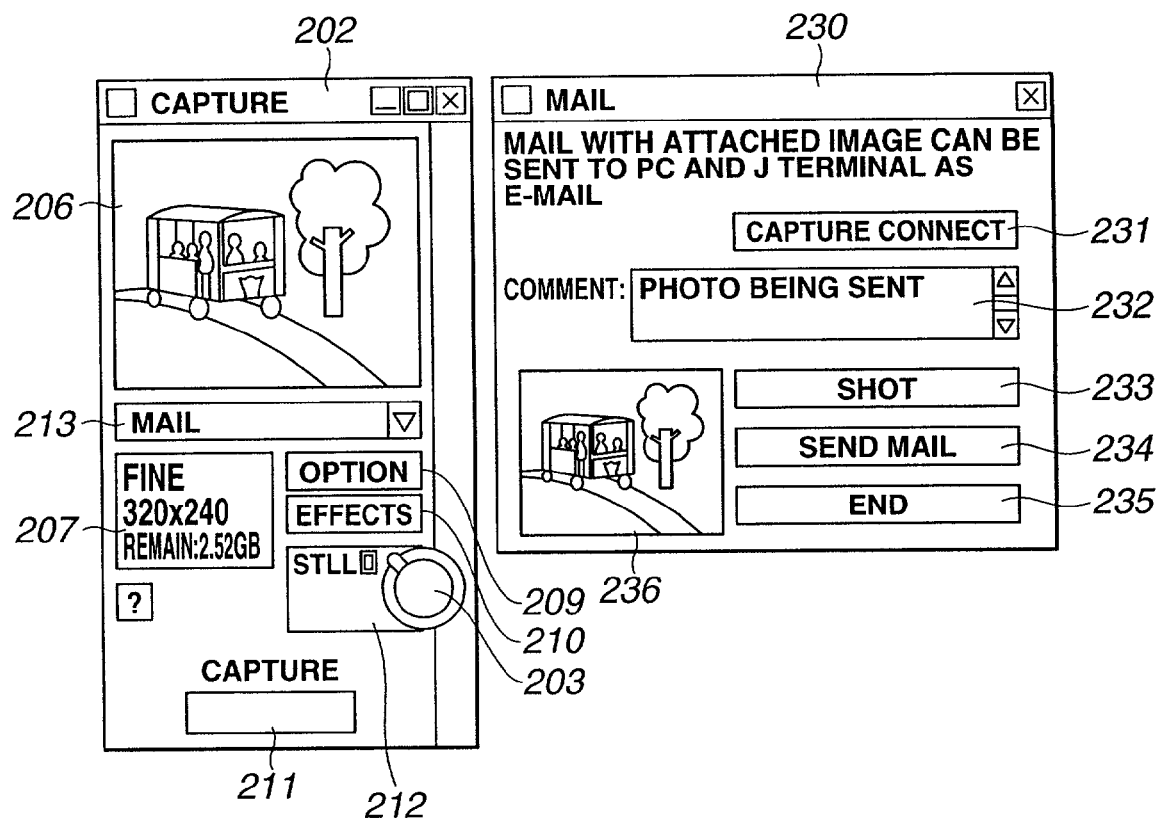
FIG. 6 shows an exemplary display on a desktop screen of a personal computer in case an E-mail program of the present embodiment is booted and a capture program is also booted in conjunction therewith.

FIG. 6 shows an exemplary display on a desktop screen of a personal computer in case the E-mail program embodying the present invention is booted and, in conjunction therewith, the capture program is also booted.

In this state, there are displayed, on the desktop screen, a mail window 230, displayed on booting the E-mail program, and a capture window 202, displayed on booting the capture program.

In the mail window 230, there are arrayed a capture connection button 231, a comment inputting area 232, a shot button 233, a mail send button 234 and a thumbnail image display area 236.

The capture connection button 231 is a virtual button commanded by the user for booting the capture program running in conjunction with the E-mail program. The user command may, for example, be a mouse click, as in the user commands as hereinafter explained. The respective buttons also are virtual buttons.

The comment inputting area 232 is an area in which a user is to input a comment as the main text of the E-mail. In the embodiment of FIG. 6, there is shown such a state in which a comment reading: "a photo is now sent" has been input to the comment inputting area 232.

The shot button 233 is used for the user to command the image capturing (photographing) via a capture program, whilst the mail send button 234 is used for the user to command transmission of an E-mail and the end button 235 is used for the user to command the end of the E-mail program.

The thumbnail image display area 236 is a display area for demonstrating a thumbnail image of an image captured by the capture program.

On the other hand, the capture window 202 is basically displayed on booting the capture program, which is able to run independently. However, if the capture program is booted responsive to the click of the capture connection button 231 of the mail window 230, the capture program is able to run in conjunction with the E-mail program of the present embodiment.

In the capture window 202, there are provided a finder image display area 206 and an application display unit 213 for displaying the name of the application program running in conjunction with the capture program. In the embodiment of FIG. 6, a letter string of [mail] is displayed in the application display unit 213 for indicating that the application program running in conjunction with the capture program is the E-mail program.

In the capture window 202, there are also provided a status display unit 207, a jog dial image 203, a jog dial menu 212, an option button 209, an effect button 210 and a capture button 211.

In the finder image display area 206, an image photographed by e.g., the CCD video camera 102, an image photographed by an externally connected video camera or digital still camera, an image read out from the recording medium or an image furnished over a communication network is displayed.

In the status display unit 207, the status information of an image displayed in the finder image display area 206 is displayed. If, for example, the photographing mode is the still image photographing mode, the image quality mode for the still image, such as [FINE] indicating the high definition, or the image size, such as 320×240 pixels, or the unused capacity of a hard disc, is displayed. If the photographing mode is the moving image photographing mode, there are displayed in the status display unit 207 the maximum possible recording time, current recording time and the image size. Meanwhile, the image format photographed by the CCD video camera 102 may be arbitrary, such that a BMP (bit map) format, for example, may be used.

The option button 209 is acted on in designating e.g., the imaging mode, while the effect button 210 is acted on when it is desired to apply an effect to the photographed image. The capture button 211 is a button having a function equivalent to the shutter button 105 as a mechanical button and acted on when starting the photographing.

The jog dial image 203 is a displayed image portion which is changed responsive to actuation of the jog dial 4. Specifically, an animation image in which the jog dial image 203 is rotated, by way of an example, is displayed with rotation of the jog dial 4. Moreover, as the jog dial 4 is rotated, the items in the jog dial menu 212 are changed responsive to the rotation of the jog dial 4. Among the items of the jog dial menu 212 demonstrated in the capture window 202, there are, for example, [STILL] indicating the still image photographing mode, [VIDEO] indicating the moving image photographing mode, letter strings or icons for transferring still images or moving images as photographed. Of these items, a desired one can be selected by actuation on the jog dial 4.

In the finder image display area 206 of the capture window 202, there are displayed an image photographed e.g., by the CCD video camera 102, externally connected video cameras or digital still cameras, an image read out from the recording medium or an image furnished over a communication network. A thumbnail image displayed in the thumbnail image display area 236 of the mail window 230 is a thumbnail image of an image displayed in the finder image display area 206 of the capture window 202.

Reverting to FIG. 5, if, after capturing of a comment of the main text of the E-mail and the image file attached to the E-mail has come to a close, the user clicks the mail send button 234 on the mail window 230, the CPU 51 proceeds to step S4 for transmitting the E-mail having the image file attached thereto in accordance with the E-mail program. The mail transmitting processing at this step S4 will be explained subsequently.

When mail transmission at step S4 has come to a close, the CPU 51 decides at step S5 whether the processing is to be repeated or terminated, in accordance with user instructions as to whether the processing is to be continued, such as by sending the E-mail again, or the application is to be terminated. If it is decided at step S5 that the processing is to be continued, processing reverts to step S2. If it is decided that the end button 235 is clicked by the user such that the application is to be terminated, the E-mail program is closed.

Figure 7:
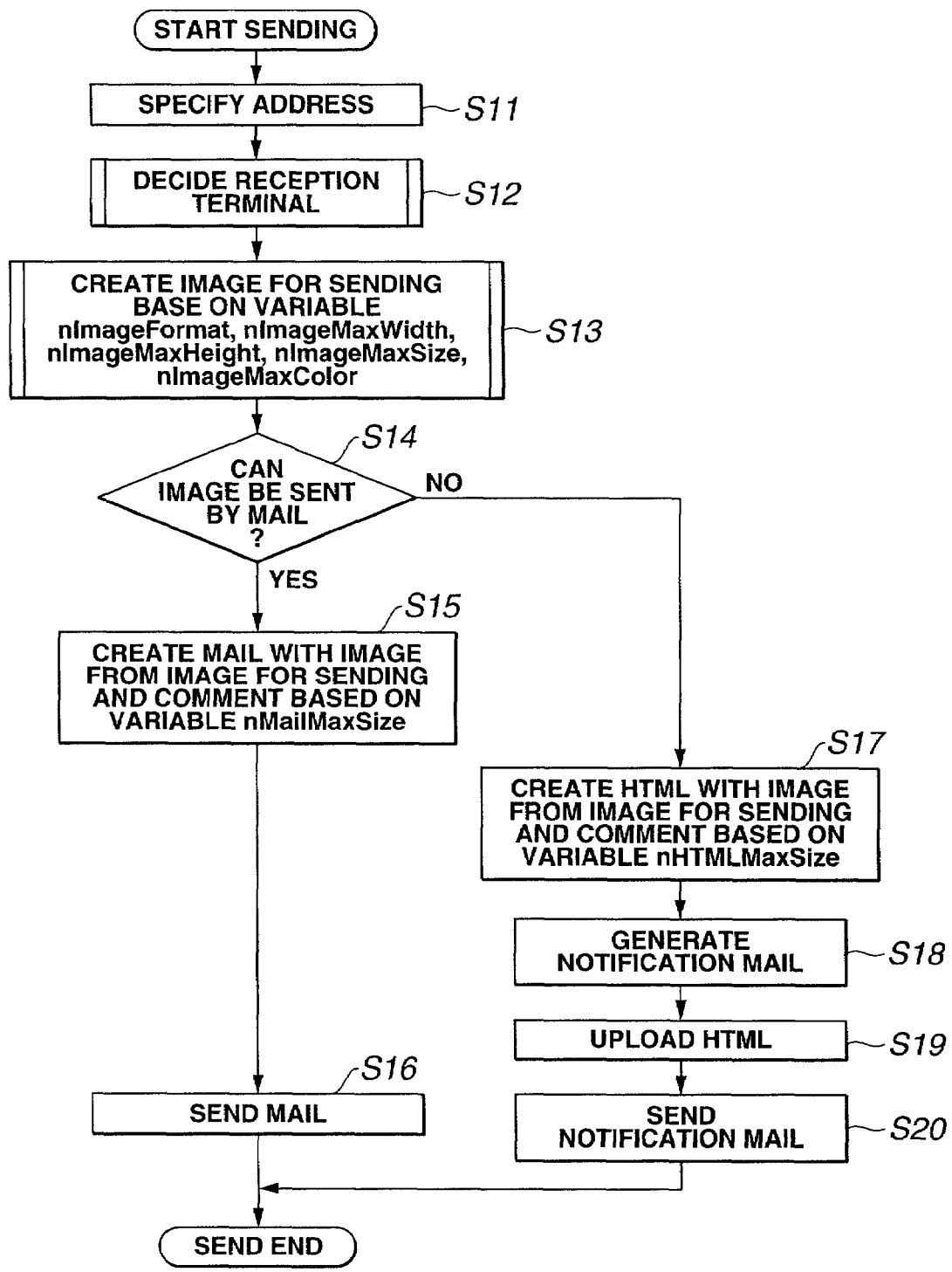
FIG. 7 is a flowchart showing detailed flow of a mail transmission processing at step S4 in FIG. 5.

FIG. 7 shows detailed mail transmission processing flow at step S4 of FIG. 5.

If, in the flowchart of FIG. 5, processing proceeds to the main transmission processing at step S4, the CPU 51 specifies an address of an E-mail (mail address) at step S11 of FIG. 7. If, in the processing at this step S11, the mail address of the destination has already been registered, a desired mail address is selected from the registered list of mail addresses. If the desired mail address has not been registered, the mail address is newly registered and selected, or the mail address is input directly.

Figure 8:
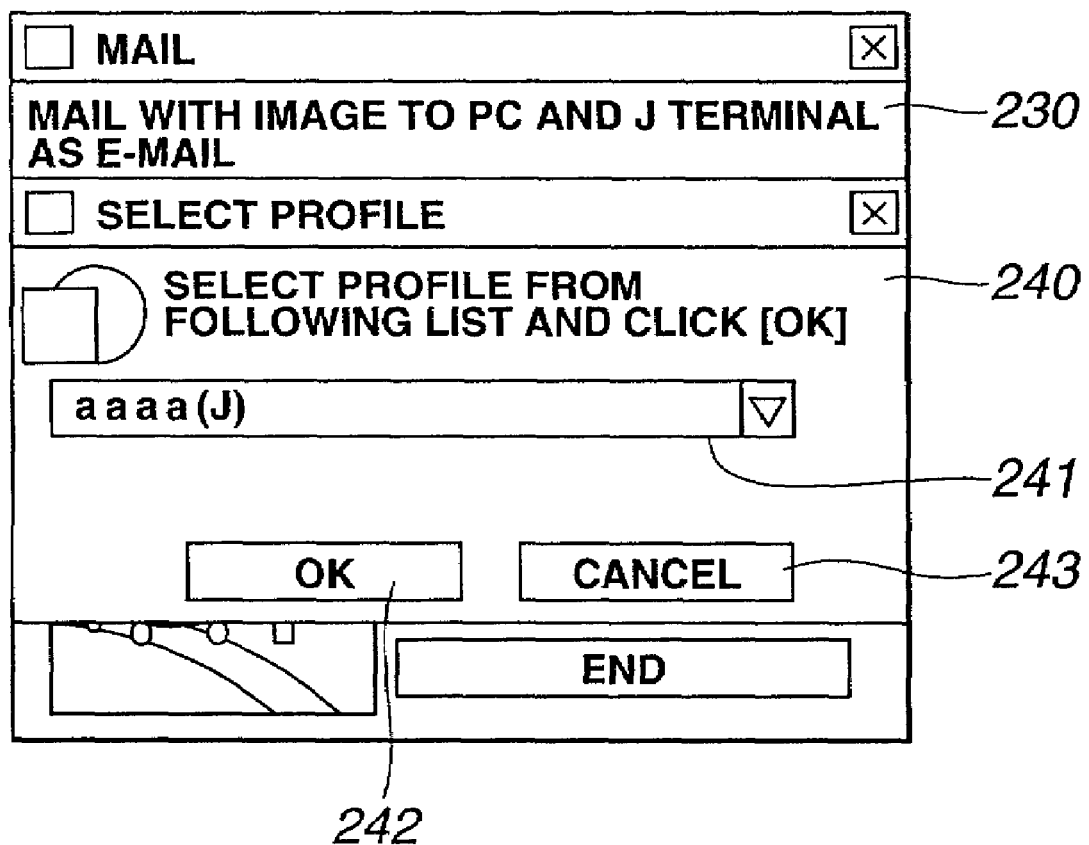
FIG. 8 shows an exemplary display of a dialog for profile selection.

If the desired mail address is selected from the list of the previously registered mail addresses, a profile selecting dialog 240, shown for example in FIG. 8, is displayed on the mail window 230, and the desired mail address is selected on the profile selecting dialog 240. On the profile selecting dialog 240, there are arranged a list display area 241, which is a list of addresses in the form of, for example, a pull-down menu, an OK button 242 for selecting one of the addresses displayed in the list display area 241 and a cancel button 243 for terminating the display of the profile selecting dialog. Although the addresses demonstrated as the pull-down menu of the address list can be the mail addresses per se, it is also possible to use a more intelligible profile name arbitrarily selected by the user from one mail address to another. In the instance of FIG. 8, the profile name is [aaaa(J)] in which [aaaa] is the user name of the reception terminal and [J] indicates that the reception terminal of the destination is a portable telephone set (J terminal) of a company J as a portable telephone servicing company. Of course, this profile name can be set arbitrarily.

Figure 9:
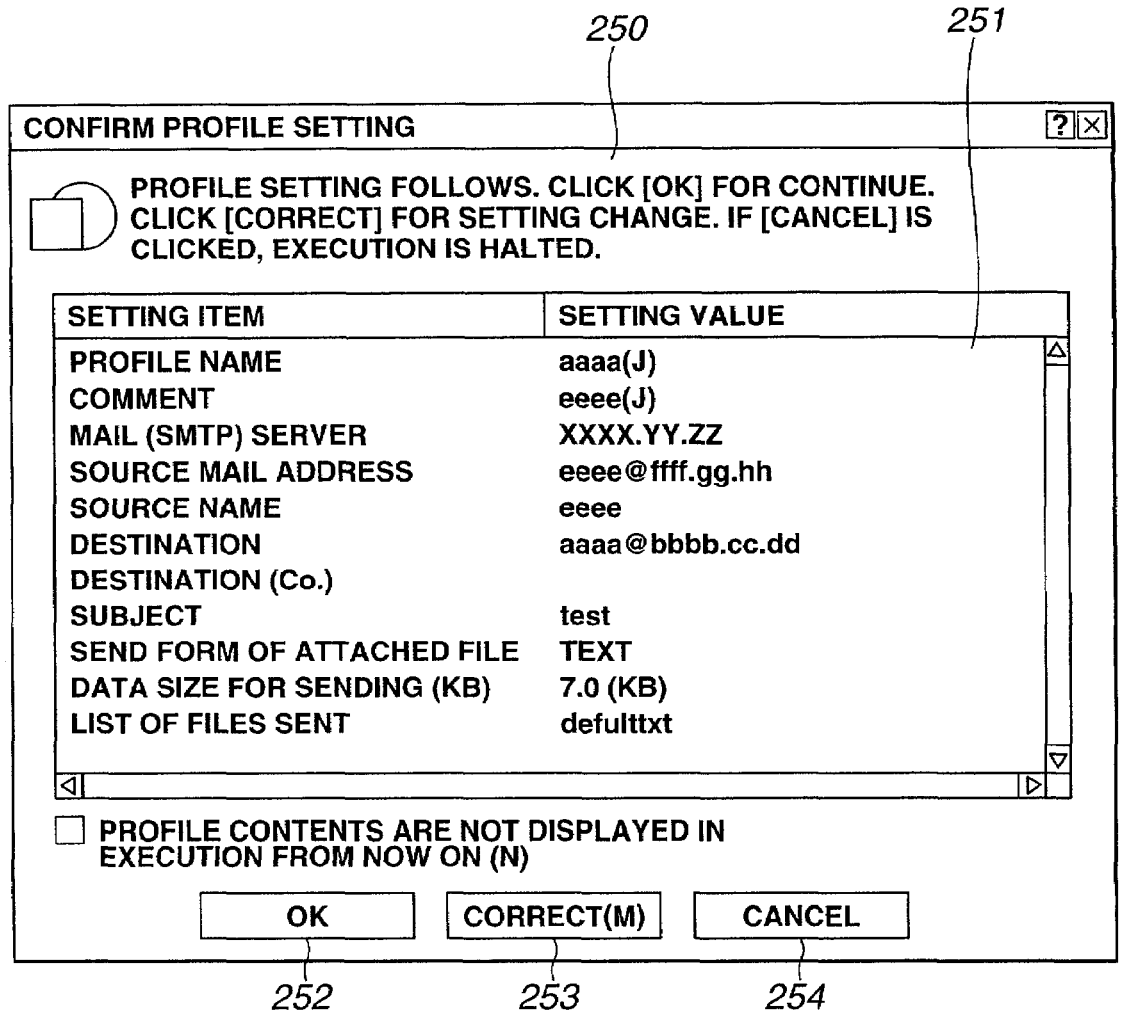
FIG. 9 shows an exemplary display of a dialog for confirming profile setting.

If, as the desired destination (profile name) has been selected in the list display area 241, the OK button 242 is clicked on the profile selecting dialog 240 of FIG. 8, the CPU 51 causes a profile setting confirmation dialog 250, shown in FIG. 9, in accordance with the E-mail program.

In the profile setting confirmation dialog 250, there are arranged a profile name selected by the user in the profile selecting dialog 240, a mail address corresponding to the profile name, an item display area 251 demonstrating the mail address of the destination, an OK button 252 pushed by the user when the contents demonstrated in the display area 251 are correct, a correction button 253 pushed by the user when it is desired to correct the contents demonstrated in the display area 251, and a cancel button 254 for the user to command cancelling the display on the dialog 250. Meanwhile, FIG. 9 shows an instance in which [aaaa(J)], as the profile name and the profile name corresponding to the previously input comment, [XXXX.YY.ZZ] as the mail server name, [eeee @ffff.gg.hh] as the mail address of the destination, [eeee] as the name of the source and [aaaa @bbbb.cc.dd] as the mail address of the destination, are demonstrated in the display area 251.

If, on the profile setting confirmation dialog 250 of FIG. 9, the correction button 253 is clicked by a user, the CPU 51 changes the profile setting confirmation dialog to a dialog 260 shown in FIG. 10 in the E-mail program.

In the profile setting confirmation dialog 260, each item in an item display area 261 can be changed. If, after changing a desired one of the items in the item display area 261, an end button 263 is clicked, the item of the changed contents is finalized. In the profile setting confirmation dialog 260, there are also arranged a reversion button 262 for the user to command reversion to the status of FIG. 9, a cancel button 264 for the user to command cancelling the display on the dialog 260 and a help button 265 pushed by the user when it is desired to know the contents displayed on the dialog.

Reverting to FIG. 7, when the designation of the destination address at step S11 has come to a close, the CPU 51 proceeds to the next step S12, in accordance with the E-mail program. At step S12, the CPU 51 checks, in accordance with the E-mail program, whether or not the reception terminal of the destination specified at step S11 is matched to the E-mail having attached the image file thereto. The processing of step S12 will be explained subsequently in detail. When the decision processing at step S12 comes to a close, the processing of the E-mail program proceeds to the next step S13.

At step S13, the CPU 51 creates an image file for transmission, based on various variables nImageFormat, nImageMaxWidth, nImageMaxHeight, nImageMaxSize and nImageMaxColor, as set by the decision processing at step S12, in accordance with the E-mail program and with the capture program. In the variables nImageFormat, the sort of the image format is set, whereas, in the variables nImageMaxWidth and nImageMaxHeight, the width and the maximum size of the image are set, respectively. In the nImageMaxSize and nImageMaxColor, the maximum file size and the maximum number of colors are set, respectively.

Figure 12:
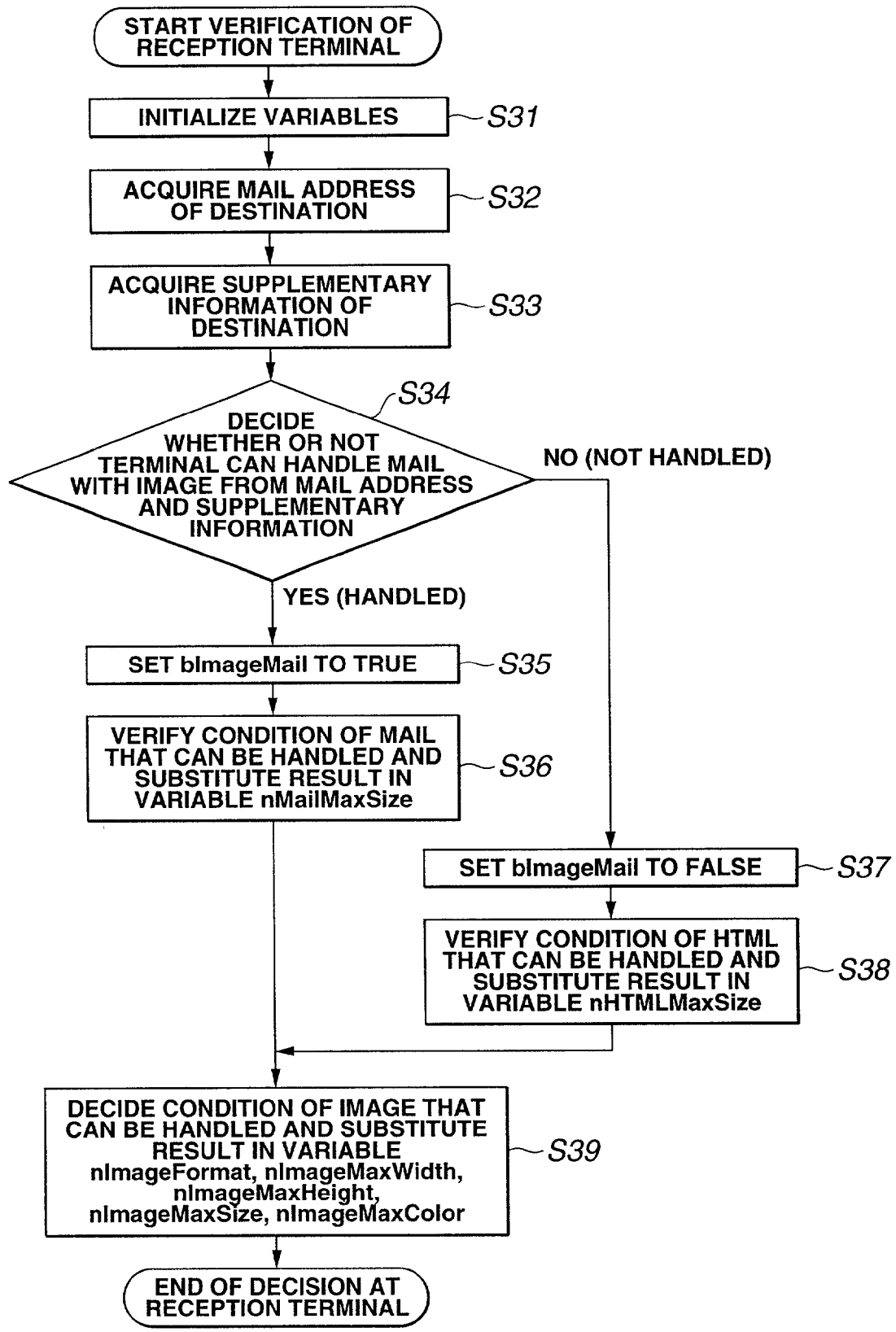
FIG. 12 is a flowchart showing detailed flow of decision processing at a reception terminal at step S12 in FIG. 7.

It is noted that the sort of the image format as set in the variable nImageFormat means the sort of the image format that can be received by the reception terminal when the reception terminal is able to handle the E-mail having the image file attached thereto, or the sort of the image format that can be received by e.g., a personal computer owned by the user of the reception terminal through a server that can be accessed by the user (WWW server), when the reception terminal is such a terminal that is unable to handle the E-mail having the image file attached thereto, as will be explained in detail subsequently by referring to FIG. 12. The width and the maximum size of the image set with the variable nImageMaxWidth and nImageMaxHeight mean the width and the maximum size of the image that can be received and demonstrated by the reception terminal when the reception terminal is such a terminal that is able to handle the E-mail having the image file attached thereto, or the width and the maximum size of the image that can be received and demonstrated by e.g., a personal computer owned by the user of the reception terminal through a server accessible for the user when the reception terminal is such a terminal that is unable to handle the E-mail having the image file attached thereto. The maximum file size of the image as set as the variable nImageMaxSize means the maximum file size of the image that can be received and demonstrated by the reception terminal when the reception terminal is such a terminal that is able to handle the E-mail having the image file attached thereto, or the maximum file size of the image that can be received and demonstrated by the reception terminal through a server accessible for the user when the reception terminal is such a terminal that is unable to handle the E-mail having the image file attached thereto. Similarly, the maximum number of colors of the image as set as the variable nImageMaxColor means the maximum number of colors of the image that can be received and demonstrated by the reception terminal when the reception terminal is such a terminal that is able to handle the E-mail having the image file attached thereto, or the maximum number of colors of the image that can be received and demonstrated by the reception terminal through a server accessible for the user when the reception terminal is such a terminal that is unable to handle the E-mail having the image file attached thereto. The processing for creating this image file for transmission will be explained in detail subsequently.

When the creation of the image file for transmission at step S13 has come to a close, the CPU 51 proceeds to the next step S14 in accordance with the E-mail program. At step S14, the CPU 51 refers to a variable bImageMain, explained subsequently with reference to FIG. 12, in accordance with the E-mail program, to check for whether or not the reception terminal is able to receive the E-mail having attached the image file thereto. If it is decided at this step S14 that the reception terminal is able to receive the E-mail, having attached the image file thereto, that is that the variable bImageMain, explained subsequently, is TRUE and YES, the CPU 51 proceeds to the processing at step S15. If it is decided at this step S14 that the reception terminal is unable to receive such E-mail, that is that the variable bImageMain, explained subsequently, is FALSE and NO, the CPU 51 proceeds to the processing at step S17.

If, at step S14, the CPU finds that the reception terminal is able to receive the E-mail, having attached the image file thereto, and proceeds to the processing at step S15, the CPU creates an E-mail, having attached the image file thereto, from the image file for transmission, formed based on the variable nImageMaxSize and the above-mentioned comment, in accordance with the E-mail program. Meanwhile, the maximum size of the E-mail that can be received by the reception terminal is set in the variable nImageMaxSize.

Figure 11:
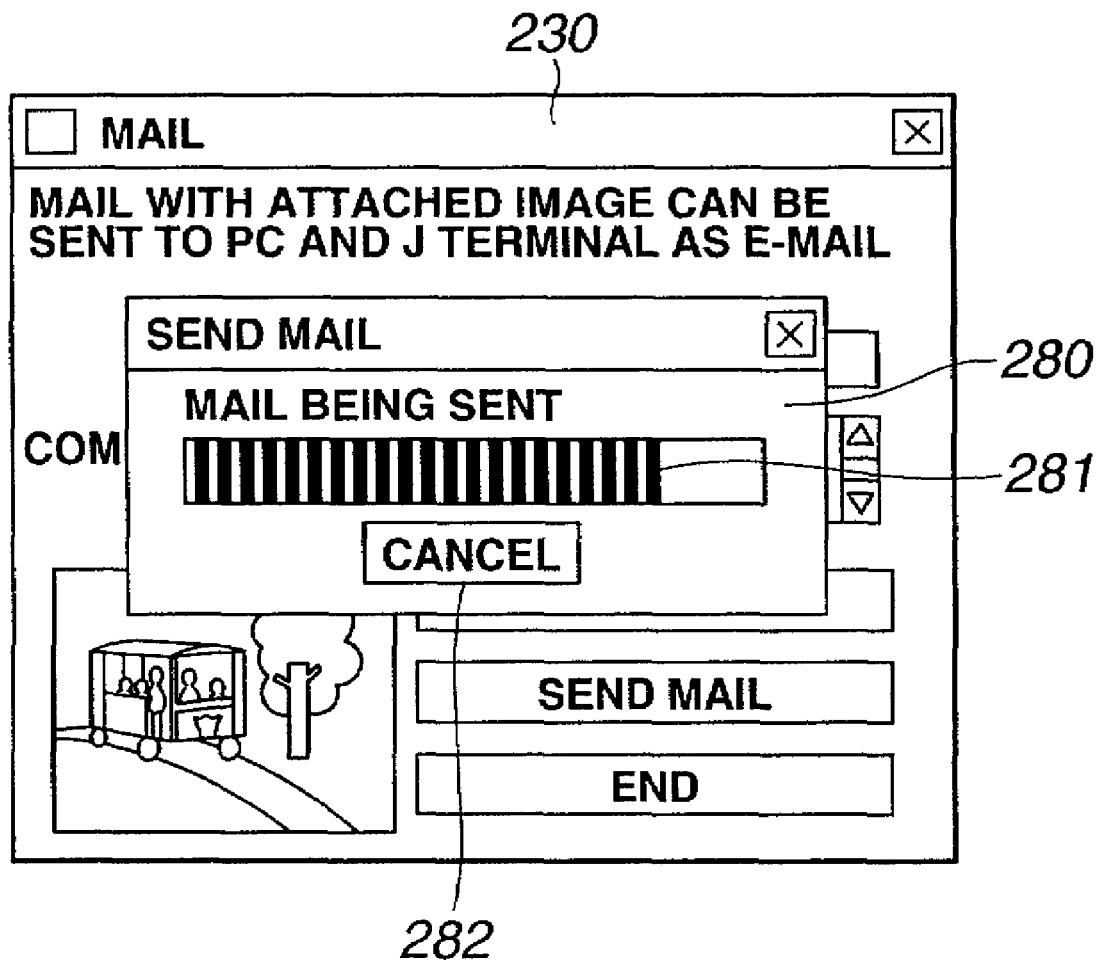
FIG. 11 shows an exemplary display of a dialog in mail transmission.

The CPU 51 then sends the E-mail, having attached the image file thereto, at step S16, to an address specified at the previous step S11, in accordance with the E-mail program, to terminate the mail transmission processing of FIG. 7. Meanwhile, an instance of a dialog 280 at the time of mail transmission at step S16 is shown in FIG. 11. On the transmission dialog 280, there are arrayed a progress state display area 281 for demonstrating the state of progress at the time of mail transmission and a cancel button 282 for the user to command cancelling the mail transmission.

If the CPU 51 verifies at step S14 that the reception terminal is unable to receive the E-mail, having attached the image file thereto and thus proceeds to the processing of step S17, the CPU creates e.g., an HTML (hypertext markup language) file, with an image file attached thereto, from the image file for transmission and the comment, based on variable nHTMLMaxSize, in accordance with the E-mail program. In the variable nHTMLMaxSize, the maximum size of the HTML file that can be received and displayed by a personal computer owned by the user of the reception terminal in question is set. On completion of the creation of this HTML file, the CPU 51 proceeds to the processing of the next step S18 in accordance with the E-mail program.

At this step S18, the CPU 51 creates a mail for notification in accordance with the E-mail program. In this notification mail, the HTML file is uploaded. Moreover, there are written in this mail the URL address of the server accessible for the user of the reception terminal and the guide. On completion of the creation of this notification mail, the CPU 51 proceeds to the processing of the next step S19 in accordance with the E-mail program.

At this step S19, the CPU 51 uploads the HTML file, prepared at step S17, to a server accessible for a user having a reception terminal, in accordance with the Email program. When the uploading at step S19 comes to a close, the CPU 51 sends the notification mail to the reception terminal of the address specified at step S11. The CPU 51 then terminates the mail transmitting processing of FIG. 7.

Meanwhile, the processing from step S17 to step S20 is such a processing of previously uploading the HTML file with the image file in a server, in case the reception terminal is inherently unable to cope with image display, as described above, and of automatically inserting a URL for viewing the image file into the main text of the E-mail, that is the above-mentioned notification mail, to transmit the resulting mail to the reception terminal. This enables the user of the reception terminal to view the image of the HTML file uploaded to the server, using the equipment allowing the user to view the image file, such as a personal computer.

The detailed flow of the decision processing at the reception terminal at step S12 of FIG. 7 is shown in FIG. 12.

At step S12 of FIG. 7, the CPU 51 first initializes the above-mentioned variables used for saving the results of decision, as processing at this step S31 of FIG. 12, in accordance with the E-mail program. The CPU then acquires the mail address of the reception terminal of the address specified by the user, by way of performing the processing at step S32, and then acquires the aforementioned supplementary information pertinent to the address, by way of performing the processing at this step S33. After this step S33, the CPU 51 proceeds to step S34.

At step S34, the CPU 51 verifies, in accordance with the E-mail program, whether or not the reception terminal accommodates (that is, is able to handle) the E-mail, having the image file attached thereto, using the acquired supplementary information as necessary. If, at this step S34, the reception terminal is found to accommodate the E-mail, having the image file attached thereto (YES), the CPU proceeds to the processing of step S35 and, if otherwise (NO), the CPU transfers to the processing of step S37.

If, at step S34, the CPU verifies that the reception terminal accommodates the E-mail, having the image file attached thereto, and hence transfers to the processing of step S35, the CPU 51 sets the variable bImageMail to TRUE in accordance with the E-mail program. Then, at step S36, the CPU verifies the maximum mail size that can be received, and that can be handled by the reception terminal, to set the result in the variable nMailMaxSize. After the processing of step S36, the CPU proceeds to the processing of step S39.

If, at step S34, the CPU 51 finds that the reception terminal is unable to accommodate the E-mail, having the image file attached thereto, and proceeds to processing at step 37, the CPU sets the variable bImageMail to FALSE, in accordance with the E-mail program. Then, at step S38, the CPU 51 verifies the maximum file size of the HTML file that can be handled by e.g., a personal computer owned by the user of the reception terminal, through a server accessible for the user of the reception terminal, and sets the result in the variable nHTMLMaxSize. After this step S38, the CPU transfers to processing at step S39.

If the reception terminal is able to accommodate the E-mail, having the image file attached thereto, the CPU 51 at step S39 checks the condition of an image that can be handled by the reception terminal, or the condition of an image that can be accommodated by e.g., a personal computer owned by a user of the reception terminal, through a server accessible for the user, in accordance with the E-mail program, and sets the variables nImageFormat, nImageMaxWidth, nImageMaxHeight, nImageMaxSize and nImageMaxColor, based on the verified result. That is, at step S39, the CPU 51 sets, based on the verified result as to the condition of the image that can be handled by the reception terminal, or the verified result as to the condition of the image that can be handled by e.g., a personal computer owned by the user of the reception terminal, the sort of the image format, as the aforementioned variable nImageFormat, and the maximum width and height of the image as the aforementioned nImageMaxWidth and nImageMaxHeight, respectively. The CPU also sets the maximum file size of the image as the variable nImageMaxSize, while setting the maximum number of colors of the image as the variable nImageMaxColor.

After this step S39, the CPU 51 furnishes the decision processing for the reception terminal to transfer to processing at step S13 of FIG. 7.

Although the explanation here is directed to only the size of the E-mail or the HTML file size, as the condition for reception by the aforementioned reception terminal or by e.g., the personal computer owned by the user of the reception terminal, this is merely for the sake of explanation, such that any suitable new conditions may also be added as appropriate.

Figure 13:
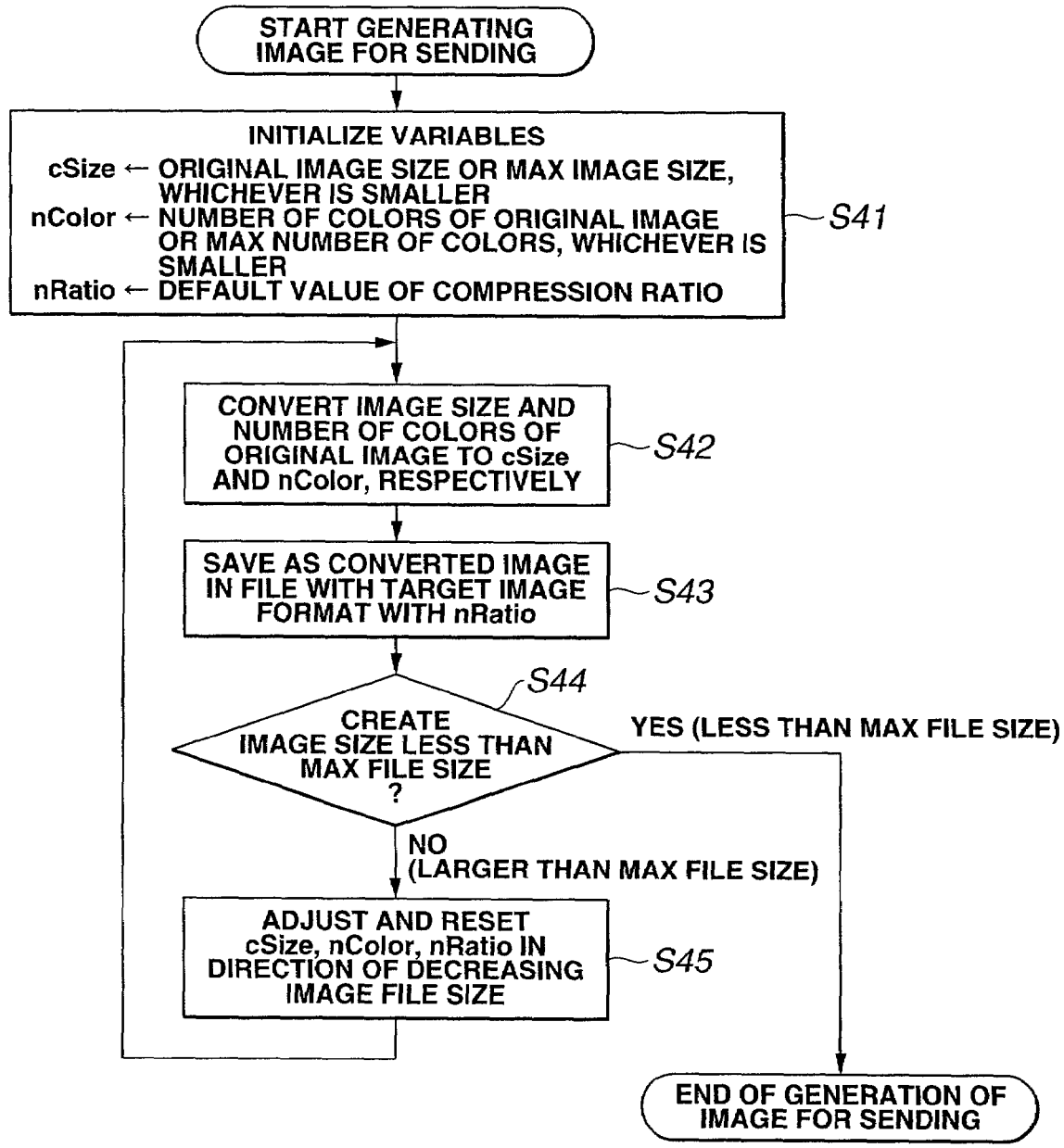
FIG. 13 is a flowchart showing detailed flow of processing for preparation of an image for transmission at step S12 in FIG. 7.

FIG. 13 shows detailed flow of processing for creation of an image for transmission at step S13 of FIG. 7.

At step S13 of FIG. 7, the CPU 51 initializes variables cSize, nColor and nRatio, by way of processing at step S41 of FIG. 13. In the variable cSize, the size of an original image, photographed or taken from outside by the CCD video camera 102, or the maximum image size that can be received and displayed by the reception terminal or by e.g., a personal computer owned by the user of the reception terminal, whichever is smaller, is set. In the variable nColor, the number of colors of the original image photographed or taken from outside by the CCD video camera 102, or the maximum number of colors that can be received and displayed by the reception terminal or by e.g., a personal computer owned by the user of the reception terminal, whichever is smaller, is set. In the variable nRatio, a default value of the image compression ratio is set.

The CPU 51 then converts the size of the original image, photographed or taken from outside by the CCD video camera 102, in keeping with the variable cSize, set as described above, by way of processing at step S42, in accordance with the E-mail program. The CPU 51 also converts the number of colors of the original image, photographed or taken from outside by the CCD video camera 102, in keeping with the variable nColor, set as described above.

The CPU 51 then compresses the image, the image size and the number of colors of which have been changed as described above, with the compression ratio equal to the as-set variable nRatio, by way of the processing at step S43, in accordance with the E-mail program, and transiently saves the compressed image as a file of the desired image format that can be received by the reception terminal or by e.g., a personal computer owned by a user of the reception terminal. The image format will be explained in detail subsequently.

The CPU 51 then verifies, at step S44, whether or not the image file of the image format, created as described above, is smaller than the maximum file size that can be received by the reception terminal or by e.g. a personal computer owned by the user of the reception terminal, in accordance with the E-mail program.

If it is found at this step S44 that the size of the image file created is larger than the aforementioned maximum file size (NO), the CPU 51 transfers to processing at step S45, in accordance with the E-mail program and with the capture program, to adjust and re-set the aforementioned variables cSize, nColor and nRatio in the direction of decreasing the image file size. The CPU then reverts to processing at step S42.

If, at step S44, the size of the image file created is smaller than the aforementioned maximum file size (YES), the CPU 51 completes the processing of generating the image for transmission, in accordance with the E-mail program and with the capture program, to transfer to processing at step S14 of FIG. 7.

Although the image is stored in a file and processed for conversion at step S43, it is also possible to save the image in a memory instead of in a file for image conversion and to save the image converted to an image of the desired size in the file.

The image format at step S43 is now explained. Meanwhile, since a personal computer in general is able to cope with any image format, depending on the application installed, the following explanation is directed to an image format that can be received and displayed by a reception terminal, such as a portable telephone set, in which limitations are imposed on the image format that can be received.

Among the image formats that can be displayed by the portable telephone set, there are, for example, GIF, PNG (portable network graphics) format, and JPEG format.

The GIF (graphics interchange format) is a sort of the image file format developed by COMPUSERVE INC. as a leading personal computer communication undertaker of USA. Recently, the GIF is frequently used for a WWW image and accommodates a color/monochromatic image with 256 colors or less. Because of its high compression efficiency, the GIF is utilized as the standard form for Internet, as is the JPEG system. The GIF is used in the standard GIF format, but also to an interlaced GIF system, in which an entire image is presented in a mosaic pattern and read-in progressively, a GIF animation system in which simple movements can be expressed in a caricature magazine page folding fashion, and in a transparent GIF format in which the background can be transparent by specifying particular colors as transparent colors. These sorts of the GIF are prescribed in GIF89a formulated in 1989. Although a majority of other file formats, such as TIFF, are of random editing, the GIF uses sequential editing, under the circumstances that the GIF was originally designed as a transmission format for a datastream. Each block of the data has a tag to permit contents to be identified. A majority of the web document creating application software and a majority of the image editing processing application software accommodate the GIF format.

The PNG format was developed by the PNG Development Group, as a file to take the place of GIF, in view of handling graphic data in a network environment, such as Internet environment. The engineer who developed this format is Thomas Botel of NASA. The PNG adopts the LZ77-based algorithm, and performs slightly complex scanning, termed Adam7, in comparison with the interlaced display proper to GIF of drawing an image by four times of scanning every several lines. Thus, more definite details can be sent than is possible with GIF with a smaller transfer volume. The Adam 7 is such a scanning in which an image is divided into plural blocks of 8×8 pixels and in which pixels in each block are sequentially sent out in seven installments to draw an image. The data supported and handled by the PNG format encompasses index colors (1/2/4/8 bits), gray scale (1/2/4/8/16 bits) and RGB colors (24, 48 bits), in contradistinction from the GIF that can handle only up to the 80-bit index color. The PNG also supports alfa channel (a masking channel having luminance) and gamma correction. Meanwhile, the GIF specifies particular colors as the background color for transmission. With the PNG, supporting the similar functions, the degree of transmission can be represented by luminance by using the alfa channel for the gray scale and for the RGB color. The animation effect, employing plural images, termed GIF animation, is not supported, and hence another standard termed MNG (multiple-image network graphics) is under consideration. Thus, the PNG format is higher in compression efficiency than the GIF format, and allows for interlacing or transparency of color and for handling of 24-bit color images. The PNG format is recommended by W3C (World Wide Web Consortium), which is the group for standardizing the WWW (World Wide Web), as being one of the graphic formats for WWW. The most recent edition of the PNG supports main WWW browsers, such as the Netscape navigator (trademark) or the Internet Explorer (trademark). The PNG may be forecast to be used in near future as a new image format to take the place of the GIF format a patent of an image compression expansion routine for which is owned by UNISIS of USA.

The JPEG (Joint Photographic Coding Experts Group Graphics Interchange Format) is an appellation of a joint organization of the ISO (International Standardization Organization) and ITU-T (International Telecommunication Union-Telecommunication Standardization Sector). In general, it denotes the compression/expansion system for still images standardized by this organization. The format is suited to a natural image, the gradation of which is changed continuously, and is of an extremely compact file size. By varying the compression ratio, the information volume can be diminished to approximately one-tenth to one-hundredth. The data compression ratio is raised by decimating color data by exploiting the properties that the human eye, sensitive to changes in luminance, is rather insensitive to changes in color. So, if an image is compressed once in accordance with the JPEG system, an original image cannot perfectly be restored. Moreover, if the compression ratio is raised, deterioration in image quality, such as occurrence of block noise, becomes outstanding. The majority of the currently available digital cameras use this JPEG system for a file format for image recording.

The JPEG provides for motion JPEG and progressive JPEG.

The motion JPEG is such a system in which a color still image compressed on the basis of the JPEG as the international standard for coding the color still image is continuously reproduced to realize moving image display, that is such a system which compresses each frame making up a video moving image in accordance with the JPEG system for recording and storage. The motion JPEG is finding application since each image frame of the moving images is formed on the basis of a still image and hence the image digitization may be performed more readily than in an encoding system having a highly advanced compression algorithm, such as MPEG (Moving Image Coding Experts Group) taking the inter-frame difference, while frame-based processing in editing may be facilitated. However, the compression ratio is not that high and hence a higher transfer speed is required or the file capacity of a digital image tends to be increased.

The progressive JPEG is a storage system for image data supported by the Netscape Navigator 2.0 (trademark) of the WW browser. With this system, an entire image in a mosaicked pattern is first displayed and read-in as focussing proceeds progressively, in contradistinction from an image of the conventional JPEG format image read in sequentially from an upper side in a blind-lowering fashion. Although the time until full display is the same, the viewer feels more relaxed since the entire image may be seen from the outset.

In the currently available E-mail reception application for personal computers, all of the aforementioned formats of images can be displayed in a majority of cases. This may, however, not be the case with E-mail reception terminals other than the personal computer. That is, in the case of the reception of an E-mail by a portable telephone set, as exemplified in the present embodiment, the image format used varies from one provider to another, such that, for example, a provider J may be using only the PNG format, whilst a provider N may be using only the GIF format. In addition, the file size, maximum number of colors or the maximum image size may be variable from one provider to another. For example, the provider J may be using the maximum image size of 680 pixels horizontal and 480 pixels vertical, and the maximum number of colors of 256, whilst the provider M may be using the maximum image size of 94 pixels horizontal and 72 pixels vertical, and the maximum number of colors of 256.

Thus, in the present embodiment, if the image is transmitted as an E-mail, the image is converted on the transmitting side in keeping with the capability of the reception terminal, as described above. In making such conversion, if a given image exceeds limitations as to the maximum number of colors and the maximum image size, the image is converted so as to fall within the limitation. The image is then converted to a file of the target image format, such as the aforementioned PNG format, GIF or JPEG. If the file resulting from the conversion is of a size exceeding the maximum file size, the number of colors following the conversion is made smaller than the maximum number of colors. This operation is repeated until the resulting file is smaller than the maximum file size. At this time, the compression ratio can be set, depending on the image format. In such case, this parameter is also varied to control the image file size. That is, the operation of adjusting the number of colors, image size or the compression ratio following conversion and of converting the image to a file is repeated to generate an image of a target file size.

If an E-mail, having an image file attached thereto, as described above, is transmitted, the user of a reception terminal may directly view an E-mail with the image attached thereto. Alternatively, the user may indirectly view the E-mail, with the attached image, by having reference to the URL in the notification mail.

In the above-described embodiment, the E-mail sending terminal is a personal computer fitted with a camera and an external memory IF (315, 1). Of course, the mobile station, such as the portable telephone set, may also serve as a transmission terminal. In particular, if a portable telephone set fitted with a camera and an external memory IF 307 serves as a sending terminal, an image photographed by the camera of the portable telephone set 307 may be sent along with the E-mail to the reception terminal, in which case the mail can be sent after converting an image file in agreement with the capability of the reception terminal, as described above.

Figure 14:
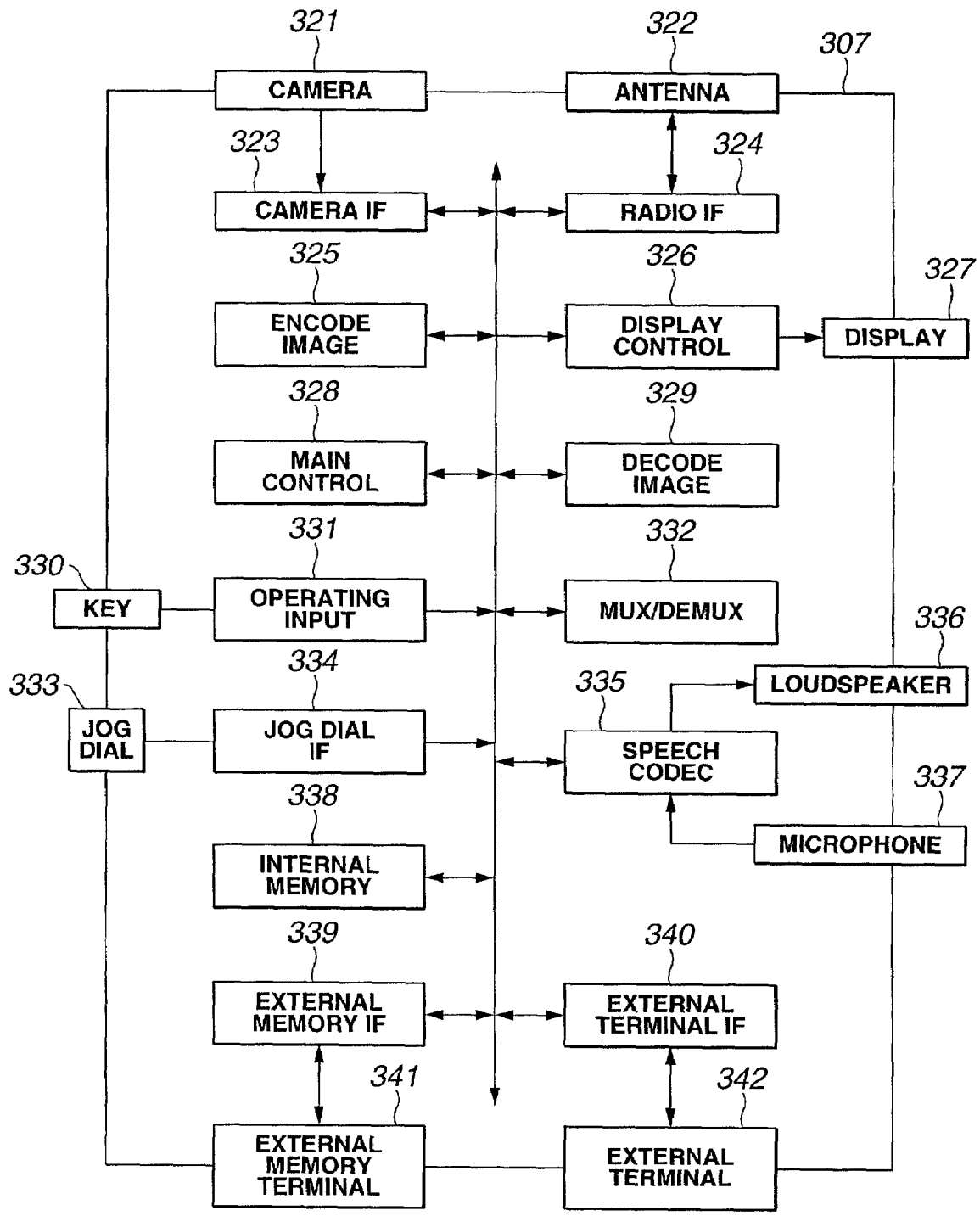
FIG. 14 shows an exemplary inner structure of a portable telephone set fitted with a camera and an external memory IF.
Figure 15:
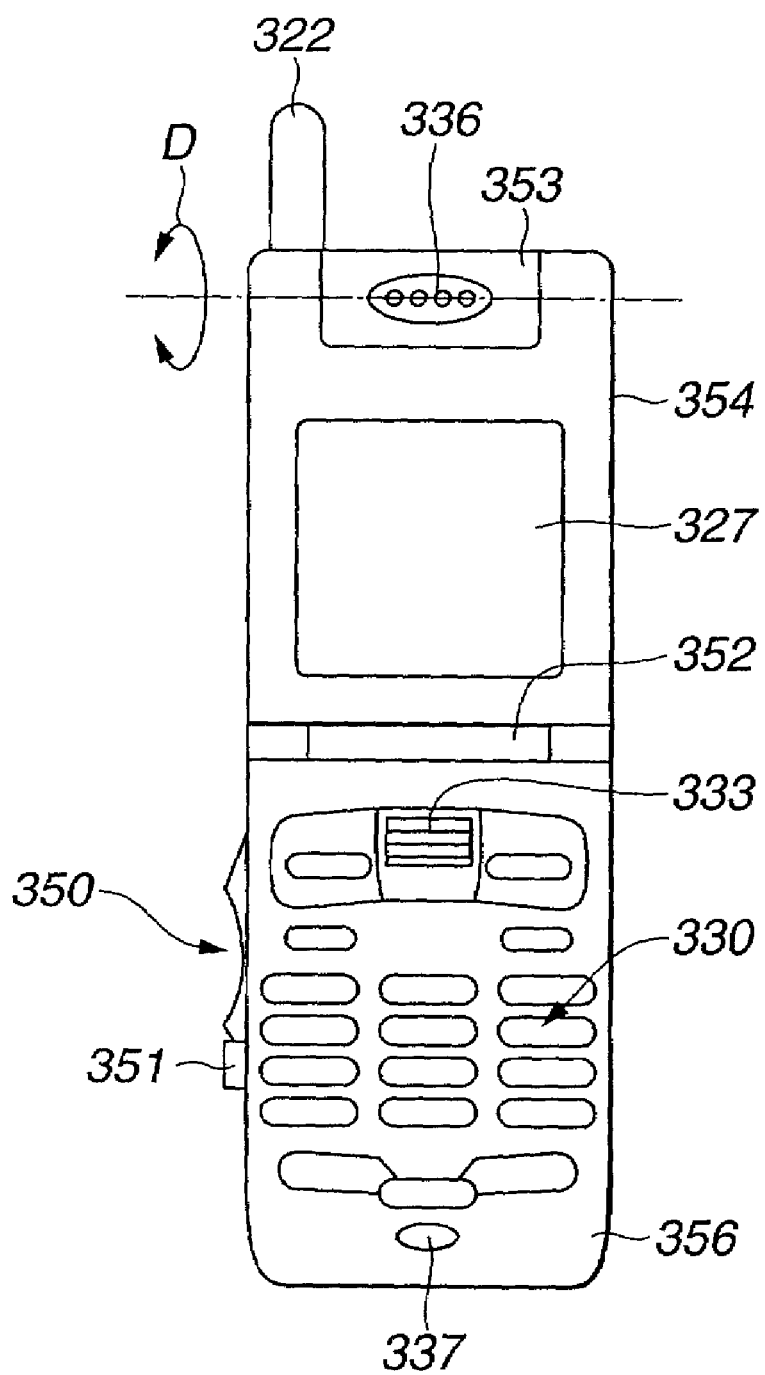
FIG. 15 is an overall view showing the side of a collapsible portable telephone set carrying keys and a display, looking from the front side.
Figure 16:
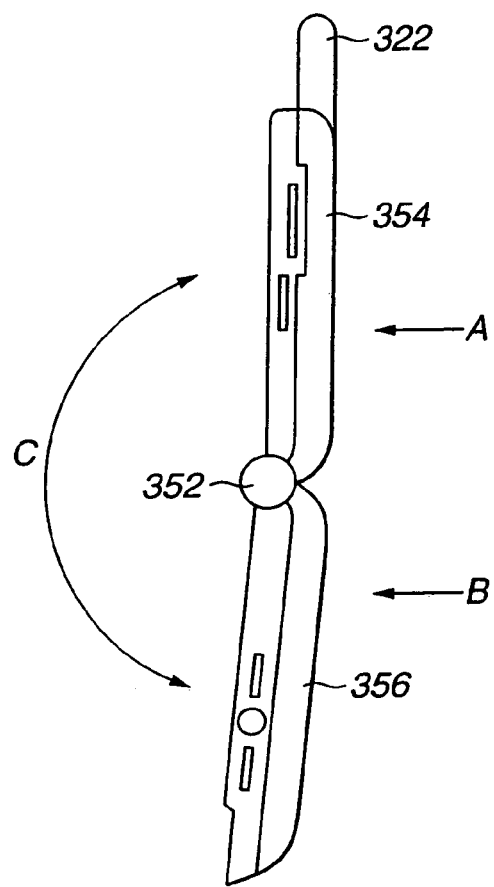
FIG. 16 is a right-hand side view showing a portable telephone set shown in FIG. 15.
Figure 17:
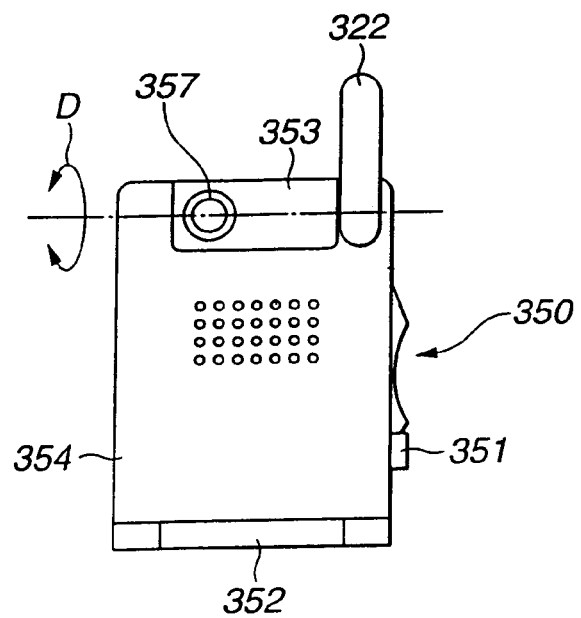
FIG. 17 is an overall view showing the portable telephone set shown in FIG. 15, in the collapsed state, looking from the direction indicated by arrow A in FIG. 16.
Figure 18:
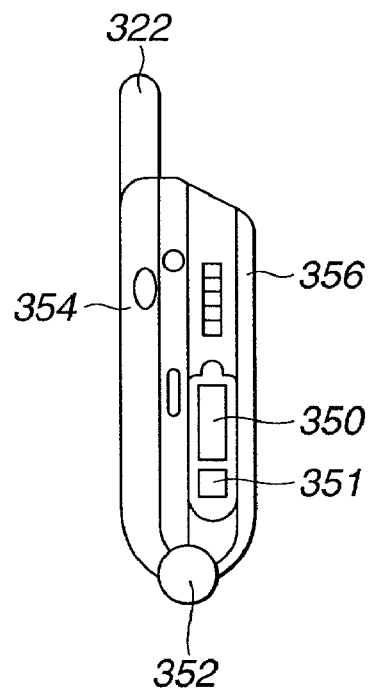
FIG. 18 is a right-hand side view showing a portable telephone set in the collapsed state shown in FIG. 17.
Figure 19:
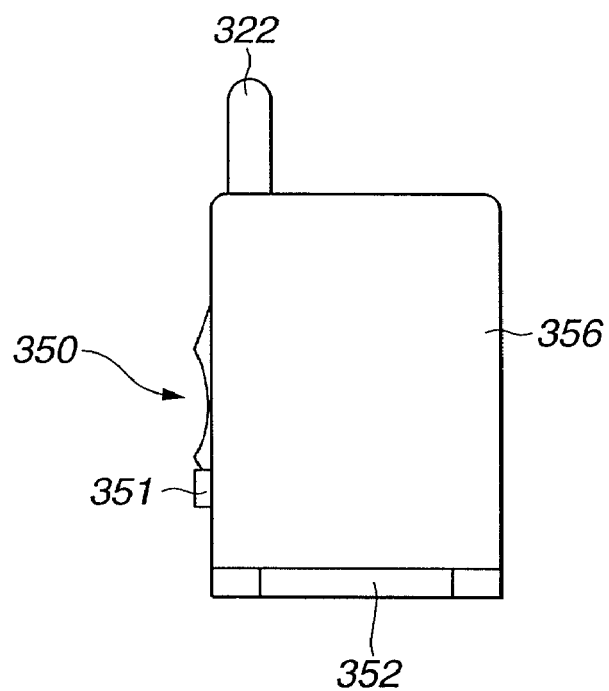
FIG. 19 is an overall view showing the portable telephone set shown in FIG. 15, in the collapsed state, looking from the direction indicated by arrow B in FIG. 16.

Referring to FIGS. 14 to 19, a specified structure of the portable telephone set fitted with a camera and an external memory IF 307 is explained. FIG. 14 shows an inner structure of the portable telephone set fitted with a camera and an external memory IF 307, FIG. 15 is an overall view showing the side of the collapsible portable telephone set 307 carrying keys and a display, looking from the front side, FIG. 16 is a right-hand side view showing the portable telephone set 307 shown in FIG. 15, and FIG. 17 is an overall view showing the portable telephone set 307 shown in FIG. 15, in the collapsed state, looking from the direction indicated by arrow A in FIG. 16. FIG. 18 is right-hand side view showing the portable telephone set 307 in the collapsed state shown in FIG. 17, and FIG. 19 is an overall view showing the portable telephone set 307 shown in FIG. 15, in the collapsed state, looking from the direction indicated by arrow B in FIG. 16.

The portable telephone set 307, shown in FIG. 14, includes, as main components, a main controller 328, an image encoder 325, an image decoder 326, an image decoder 329, a display controller 326, an internal display unit 327, a multiplexer/demultiplexer 332, a radio interfacing (IF) unit 324, a speech codec unit 335, a video camera 321, a camera interfacing (IF) unit 324, an operating input unit 331, a jog dial 333, a jog dial interfacing (IF) unit 334, an external memory connecting terminal 341, and an external memory interfacing (IF) unit 339. The portable telephone set 307 also includes an antenna 322, an external terminal 342, an external terminal IF unit 340, a key unit 330, an internal memory 338, a loudspeaker 336 and a microphone 337. Of these, the main controller 328, camera IF unit 323, image encoder 325, operating input unit 331, jog dial interfacing (IF) unit 334, internal memory 338, external memory interfacing (IF) unit 339, radio interfacing (IF) unit 324, display controller 326, image decoder 329, multiplexer/demultiplexer 332, speech codec unit 335 and the external terminal IF unit 340 are interconnected over a bus.

The main controller 328 is comprised of a CPU, while the internal memory 338 is made up of a ROM and a RAM. The main controller 328 comprehensively controls various components of the portable telephone set, based on the program stored in the ROM, to realize the function as the portable telephone set and the aforementioned functions of the present invention. That is, the main controller 328 at least performs the function similar to that of the E-mail program in the personal computer of FIG. 4.

The video camera 321 is enclosed in the portable telephone set 307 and sends photographed image data to the camera IF unit 323. Meanwhile, the video camera 321 may be removably mounted on the portable telephone set 307.

The camera IF unit 323 sends image data furnished from the video camera 321 to the image encoder 325, external memory interfacing (IF) unit 339, external terminal IF unit 340 or to the display controller 326.

The display controller 326, fed with the image data from the camera IF unit 323, controls the internal display unit 327 for displaying an image indicated by the image data.

The internal display unit 327 uses e.g., a color LCD and has sufficient resolution to display the JPEG still image or the MPEG moving image. For example, the internal display unit 327 has a sufficient number of pixels (180×144) to display e.g., QCIF signals. This internal display unit 327 displays an image under control by the display controller 326.

The image encoder 325, fed with image data from the camera IF unit 323, encodes the image data in accordance with the JPEG system or the MPEG system, such as MPEG4 system, and sends the encoded image data to the multiplexer/demultiplexer 332, external memory interfacing (IF) unit 339, external terminal IF unit 340 or to the image decoder 329.

The external memory connecting terminal 341 is a terminal connected to the external memory housed in the stick-, card- or stamp-like casing. The external memory interfacing (IF) unit 339 exchanged various data between it and the external memory connected to the external memory connecting terminal 341. That is, the external memory interfacing (IF) unit 339 operates under control by the main controller 328 to write image data fed from the camera IF unit 323, encoded image data fed from the image encoder 325, image data decoded by the image decoder 329, data received by the radio (IF) unit 324 and speech data encoded or decoded by the speech codec unit 335, in the external memory. The external memory interfacing (IF) unit 339 operates under control by the main controller 328 to send unencoded image data read out from the external memory to the display controller 326, to send the readout encoded image data to the image decoder 329 and to send read-out speech data to the speech codec unit 335.

The external terminal 342 is a terminal connected directly or through a cord to an external equipment. The external terminal IF unit 340 exchanges various data between it and the external equipment connected to the external terminal 342. That is, the external terminal IF unit 340 operates under control by the main controller 328 to send image data supplied from the camera IF unit 323 from the external terminal 342 to the external equipment, and to send encoded image data supplied from the image encoder 325, encoded image data supplied from the image encoder 325, image data decoded by the image decoder 329, data received by the radio interfacing (IF) unit 324 and speech data encoded or decoded by the speech codec unit 335, to the external equipment. The external terminal IF unit 340 operates under control by the main controller 328 to send unencoded image data fed thereto from the external memory to the display controller 326, to send the encoded image data as fed thereto to the image decoder 329 and to send read-out speech data to the speech codec unit 335.

The image decoder 329 decodes compressed encoded image data to send the reproduced image data to the display controller 326.

The display controller 326 controls the internal display unit 327 to display an image represented by the image data supplied from the camera IF unit 323 or from the image decoder 329.

The internal display unit 327 uses e.g., a color CD and has sufficient resolution to display the JPEG still image or the MPEG moving image. For example, the internal display unit 327 has a sufficient number of pixels (180×144) to display e.g., QCIF signals. This internal display unit 327 displays an image under control by the display controller 326.

The multiplexer/demultiplexer 332 includes three operating modes, namely an image speech communication mode, a speech communication mode and a communication mode, and operates under a mode specifying by the main controller 328.

In the image speech communication mode, the multiplexer/demultiplexer 332 multiplexes encoded image data, photographed by the video camera 321 and encoded by the image encoder 325, encoded speech data supplied from the speech codec unit 335, and other data supplied from the main controller 328, in accordance with a pre-set multiplexing system, such as H.221 of ITU-T recommendations H.223 of the ITU-T recommendations, or modifications thereof, and routes resulting multiplexed transmission data to the radio interfacing (IF) unit 324. In the image speech communication mode, the multiplexer/demultiplexer 332 also demultiplexes the transmission data supplied from the radio interfacing (IF) unit 324 into encoded image data, encoded speech data and other data to route the respective data to the image decoder 329, speech codec unit 335 and to the main controller 328.

In the image speech communication mode, the multiplexer/demultiplexer 332 directly sends the encoded speech data from the speech codec unit 335 through he radio interfacing (IF) unit 324 to the antenna 322. Moreover, in the image speech communication mode, the multiplexer/demultiplexer 332 directly sends transmission data (encoded speech data) fed from the radio interfacing (IF) unit 324 over the antenna 322 to the speech codec unit 335.

In the data communication mode, the multiplexer/demultiplexer 332 sends transmission data supplied from the main controller 328 to the radio interfacing (IF) unit 324 to send the data to a counterpart terminal. The multiplexer/demultiplexer 332 also is able to receive transmission data sent from the counterpart terminal through the radio interfacing (IF) unit 324.

The speech codec unit 335 has two operating modes, that is the image speech communication mode and the speech communication mode, and operates under the mode specified by the main controller 328. In the image speech communication mode, the speech codec unit 335 digitizes speech signals from the microphone 337, while encoding the speech signals in accordance with a pre-set low-rate speech encoding system, such as G729 of the ITU-T recommendations, to produce encoded speech data, which is sent to the multiplexer/demultiplexer 332. In the image speech communication mode, the speech codec unit 335 decodes the ADPCM codes in the encoded speech data supplied from the multiplexer/demultiplexer 332, while converting the decoded data into analog signals to produce speech signals which are routed to the loudspeaker 336.

In the speech call mode, the speech codec unit 335 digitizes speech signals from the microphone 337, while encoding the digitized signal in accordance with, for example, the ADPCM system (G721 of the ITU-T recommendations) to produce encoded speech data, which encoded speech data are sent to the multiplexer/demultiplexer 332. In the speech call mode, the speech codec unit 335 decodes the ADPCM codes in the encoded speech data supplied from the multiplexer/demultiplexer 332 and converts the decoded data to produce speech signals, which speech signals are sent to the loudspeaker 336.

On receipt of an operating signal from the key unit 330, made up of operating devices, such as plural key switches, the operating input unit 331 notifies command signals thereof to the main controller 328.

The jog dial 333 has functions substantially similar to those of the jog dial 4 provided on the personal computer shown in FIG. 1 and generates signals corresponding to rotation and push operations. The jog dial interfacing (IF) unit 334 sends an operating signal from the jog dial 333 to the main controller 328.

Referring to FIGS. 15 to 19, the portable telephone set 307, fitted with the camera and the external memory IF, includes an upper casing 354, carrying the antenna 322, display 327 and the loudspeaker 336, and a lower casing 356, carrying the key unit 330, jog dial 333, an external memory insertion/ejection opening 350 and the microphone 337. The upper and lower casings 354, 356 are interconnected by e.g., a hinge 352, by means of which the upper and lower casings 354, 356 can be collapsed in the direction indicated by arrow C at a longitudinal mid portion of the device.

The upper casing 354 is provided with a camera arraying portion 353 rotatably fulcrumed in the direction indicated by arrow D. This camera arraying portion 353 is provided with the video camera 321, at least one lens 357 and with a CCD. The portable telephone set of the present embodiment, in which the lens 357 of the video camera is fitted on the rotatably fulcrumed camera arraying portion 353, has an improved degree of freedom in the photographing direction.

The external memory insertion/ejection opening 350, provided on the lower casing 356, is designed so that the external memory, such as the stick-shaped external memory, can be introduced therein. A button 351 is an ejection button thrust when ejecting the external memory inserted into the external memory insertion/ejection opening 350.

In the present embodiment, described above, if, in sending an E-mail with a file attached thereto, and opening or viewing the attached file in the reception terminal, the contents of the attached file can be displayed in the reception terminal irrespective of the file format of the attached file to the transmitted E-mail, the image size or the maximum number of colors in displaying the file contents.

In the present embodiment the contents of the attached file can be confirmed by the user on the reception terminal. The present invention may however be applied to such a case in which, if the format itself of the main text of the E-mail is not accommodated by the reception terminal, the format of the E-mail is to be converted to a format accommodated by the reception terminal.

The present embodiment is directed to the capability of the reception terminal itself. However, the present invention may also be applied to such a case in which e.g., the file is to be converted in meeting with the capability of the entire system encompassing the reception terminal.

The medium used for installing the program for executing the above-described sequence of operations on a computer for execution by the computer includes not only package mediums, such as floppy disc, CD-ROMs or DVDs, but also a semiconductor memory or a magnetic disc in which the program is stored transiently or perpetually. The medium used for installing the program may also be implemented by wired or radio communication mediums, such as local area network, Internet or digital satellite broadcast or a variety of communication interfaces, such as routers or modems used for transferring or receiving the program furnished by these communication mediums. The medium used for installing the program is, therefore, to be construed broadly to encompass all of these mediums.

What is claimed is:

1. An information processing apparatus configured to transmit an E-mail information, said E-mail information including an E-mail message body and an attached image file to a reception terminal, the apparatus comprising:
   an accommodating capability verifying unit configured to verify an information accommodating capability in at least a reception terminal or in a communication system encompassing said reception terminal, based only on a domain of an E-mail address used in sending the E-mail information to said reception terminal, wherein said information accommodating capability includes maximum number of colors to be displayed by the reception terminal, a maximum image size to be displayed by the reception terminal, a file format of an image that can be displayed by the reception terminal, and a maximum file size of attachment to be received by the reception terminal;
   an information converting unit configured to convert the attached image file to include a number of colors equal to a maximum number of colors allowed by the reception terminal, to be equal to the maximum image size to be displayed by the reception terminal to generate a first image file, and then to convert the first image file into a format matching the file format in the information accommodating capability to generate a second image file, and to adjust and reset a size of the second image file and the number of colors in the second image file in order to cause the second image file to be a size less than the maximum size receivable by the reception terminal in response to a determination that the second image file is larger than a maximum size receivable by the reception terminal; and
   a transmission unit configured to transmit said E-mail information including a converted image file.

2. The information processing apparatus according to claim 1, wherein, if said attached image file is a moving image file and the information accommodating capability of said reception terminal or said conmmnication system encompassing said reception terminal corresponds only to a still image file, said information converting unit renders one or plural frames making up said moving image file into the attached image.

3. An information processing method for transmitting an E-mail information, said E-mail information including an E-mail message body and an attached image file, to a reception terminal, comprising:
   verifying an information accommodating capability in at least a reception terminal or in a communication system encompassing said reception terminal, based only on a domain of an E-mail address used in sending the E-mail information to said reception terminal, wherein said information accommodating capability includes maximum number of colors to be displayed by the reception terminal, a maximum image size to be displayed by the reception terminal, a file format of an image that can be displayed by the reception terminal, and a maximum file size of an attachment to be received by the reception terminal;
   converting the attached image file to include a number of colors equal to a maximum number of colors allowed by the reception terminal and to be equal to the maximum image size to be displayed by the reception terminal to generate a first image file;
   converting the first image file into a format matching the file format in the information accommodating capability to generate a second image file;
   adjusting and resetting a size of the second image file and the number of colors in the second image file in order to cause the second image file to be a size less than the maximum size receivable by the reception terminal in response to a determination that the second image file is larger than a maximum size receivable by the reception terminal; and
   transmitting said E-mail information including a converted image file.

4. The information processing method according to claim 3, wherein, if the attached image file is a moving image file and the information accommodating capability of said reception terminal or the communication system encompassing said reception terminal is matched only to a still image file, one frame or plural frames making up said moving image file is rendered into the attached image file.

5. An information processing system comprising:
   one or more reception terminals;
   one or more transmission terminals;
   said one or more transmission terminals configured to send an E-mail information, said E-mail information including an E-mail message body and an attached image file, to a desired reception terminal including;
   an accommodating capability verifying unit configured to verify an information accommodating capability in at least a reception terminal or in a communication system encompassing said reception terminal, based only on a domain of an E-mail address used in sending the E-mail information to said reception terminal, wherein said information accommodating capability includes maximum number of colors to be displayed by the reception terminal, a maximum image size to be displayed by the reception terminal, a file format of an image that can be displayed by the reception terminal, and a maximum file size of attachment to be received by the reception terminal;
   an information converting unit configured to convert the attached image file to include a number of colors equal to a maximum number of colors allowed by the reception terminal, to be equal to the maximum image size to be displayed by the reception terminal to generate a first image file, and then to convert the first image file into a format matching the file format in the information accommodating capability to generate a second image file, and to adjust and reset a size of the second image file and the number of colors in the second image file in order to cause the second image file to be a size less than the maximum size receivable by the reception terminal in response to a determination that the second image file is larger than a maximum size receivable by the reception terminal; and a transmission unit configured to transmit said E-mail information including a converted image file, said reception terminal including a reception unit configured to receive said E-mail information including the converted image file sent from said transmission terminal, and an information opening unit configured to open the E-mail information including the converted image file.

6. The information processing system according to claim 5, wherein, if the attached image file is a moving image file and the information accommodating capability of said reception terminal or the communication system encompassing said reception terminal is matched only to a still image file, said information converting means of said transmission terminal renders one frame only or plural frames making up said moving image file into the attached image file.

7. An information processing method for transferring an E-mail information, said E-mail information including an E-mail message body and attached file, from a transmission terminal to a reception terminal, comprising:

verifying an information accommodating capability in at least a reception terminal or in a communication system encompassing said reception terminal, based only on a domain of an E-mail address used in transmitting the E-mail information to said reception terminals, wherein said information accommodating capability includes maximum number of colors to be displayed by the reception terminal, a maximum image size to be displayed by the reception terminal, a file format of an image that can be displayed by the reception terminal, and a maximum file size of an attachment to be received by the reception terminal;

converting the attached image file to include a number of colors equal to a maximum number of colors allowed by the reception terminal and to be equal to the maximum image size to be displayed by the reception terminal to generate a first image file;

converting the first image file into a format matching the file format in the information accommodating capability to generate a second image file;

adjusting and resetting a size of the second image file and the number of colors in the second image file in order to cause the second image file to be a size less than the maximum size receivable by the reception terminal in response to a determination that the second image file is larger than a maximum size receivable by the reception terminal;

transmitting said E-mail information including a converted image file;

receiving said E-mail information including the converted image file; and opening the E-mail information including the converted image file.

8. The information processing method according to claim 7, wherein, if the attached image file is a moving image file and the information accommodating capability of said reception terminal or the communication system encompassing said reception terminal is matched only to a still image file, one frame or plural frames making up said moving image file are rendered into the attached image file.

9. A computer readable medium configured to store instructions for causing an information processing apparatus to execute a program for transmitting an E-mail information, said E-mail information including an E-mail message body and an attached image file, comprising steps of:

verifying an information accommodating capability in at least a reception terminal or in a communication system encompassing said reception terminal, based only on a domain of an E-mail address used in sending the E-mail information to said reception terminal, wherein said information accommodating capability includes maximum number of colors to be displayed by the reception terminal, a maximum image size to be displayed by the reception terminal, a file format of an image that can be displayed by the reception terminal, and a maximum file size of an attachment to be received by the reception terminal;

converting the attached image file to include a number of colors equal to a maximum number of colors allowed by the reception terminal and to be equal to the maximum image size to be displayed by the reception terminal to generate a first image file;

converting the first image file into a format matching the file format in the information accommodating capability to generate a second image file;

adjusting and resetting a size of the second image file and the number of colors in the second image file in order to cause the second image file to be a size less than the maximum size receivable by the reception terminal in response to a determination that the second image file is larger than a maximum size receivable by the reception terminal; and transmitting said E-mail information including a converted image file.

10. A computer readable medium configured to store instructions for causing an information processing apparatus to execute a program for transmitting an E-mail information, said E-mail information including a message body and an attached image file, comprising steps of:

verifying an information accommodating capability in at least a reception terminal or in a communication system encompassing said reception terminal, based only on a domain of an E-mail address used in transmitting the E-mail information to said reception terminal, wherein said information accommodating capability includes maximum number of colors to be displayed by the reception terminal, a maximum image size to be displayed by the reception terminal, a file format of an image that can be displayed by the reception terminal, and a maximum file size of an attachment to be received by the reception terminal;

converting the attached image file to include a number of colors equal to a maximum number of colors allowed by the reception terminal and to be equal to the maximum image size to be displayed by the reception terminal to generate a first image file;

converting the first image file into a format matching the file format in the information accommodating capability to generate a second image file;

adjusting and resetting a size of the second image file and the number of colors in the second image file in order to cause the second image file to be a size less than the maximum size receivable by the reception terminal in response to a determination that the second image file is larger than a maximum size receivable by the reception terminal;

transmitting said E-mail information including a converted image file;

receiving said E-mail information including the converted image file; and opening the E-mail information including the converted image file.

\* \* \* \* \*